US012252381B2

(12) United States Patent
Kuffner et al.

(10) Patent No.: US 12,252,381 B2
(45) Date of Patent: Mar. 18, 2025

(54) TILLER HEAD

(71) Applicant: CROWN EQUIPMENT CORPORATION, New Bremen, OH (US)

(72) Inventors: Susanne Kuffner, Feldkirchen (DE); Jim Kraimer, Feldkirchen (DE); Roland Müller, Feldkirchen (DE); Luying Sun, Jiangsu (CN); Christoph Babel, Feldkirchen (DE)

(73) Assignee: Crown Equipment Corporation, New Bremen, OH (US)

( * ) Notice: Subject to any disclaimer, the term of this patent is extended or adjusted under 35 U.S.C. 154(b) by 446 days.

(21) Appl. No.: 17/673,183

(22) Filed: Feb. 16, 2022

(65) Prior Publication Data

US 2022/0340402 A1  Oct. 27, 2022

Related U.S. Application Data

(63) Continuation of application No. PCT/CN2021/088760, filed on Apr. 21, 2021.

(51) Int. Cl.
*B66F 9/075* (2006.01)
(52) U.S. Cl.
CPC .................. *B66F 9/0759* (2013.01)
(58) Field of Classification Search
CPC .................................................. B66F 9/0759
See application file for complete search history.

(56) References Cited

U.S. PATENT DOCUMENTS

| 5,007,301 | A | 4/1991 | Powell |
| 5,033,326 | A * | 7/1991 | Powell ................ B62D 51/001 |
| | | | 200/332.2 |
| 7,237,645 | B2 | 7/2007 | Lohmann et al. |
| 7,383,915 | B2 | 6/2008 | David et al. |

(Continued)

FOREIGN PATENT DOCUMENTS

| CN | 205114966 U | 12/2019 |
| CN | 100465040 C | 11/2020 |

(Continued)

OTHER PUBLICATIONS

DE19601694C2 Machine English translation (Year: 2001).*
DE102017111941 A1 Machine English Translation (Year: 2018).*
DE 19601694 A1 Machine English Translation (Year: 1997).*

*Primary Examiner* — Jason D Shanske
*Assistant Examiner* — Matthew James O'Neill
(74) *Attorney, Agent, or Firm* — Dinsmore & Shohl LLP

(57) ABSTRACT

A tiller head for an industrial truck is shown which comprises a central portion, a left handle portion that is attached to a left side of the central portion and a right handle portion that is attached to a right side of the central portion, which is opposite to its left side, and an actuating element. The handle portions and the central portion define a front side of the tiller head and a back side of the tiller head, which is opposite to its front side. The front side of the tiller head and the back side of the tiller head extend transverse to the left side of the central portion and the right side of the central portion. The actuating element has an operable front surface and an operable back surface, and the actuating element is mounted to a front side of the central portion.

20 Claims, 15 Drawing Sheets

(56) References Cited

U.S. PATENT DOCUMENTS

| | | | |
|---|---|---|---|
| 7,641,020 B2 * | 1/2010 | Lohmann | B62B 5/06 |
| | | | 180/19.1 |
| 7,789,188 B2 | 9/2010 | Standke | |
| 9,205,882 B1 | 12/2015 | Hoffman | |
| 9,365,228 B2 | 6/2016 | Dunigan et al. | |
| 9,376,299 B2 | 6/2016 | Hoffman | |
| 10,730,728 B1 | 8/2020 | Qichen et al. | |
| 2005/0098375 A1 * | 5/2005 | David | B62D 1/14 |
| | | | 180/315 |
| 2017/0267506 A1 | 9/2017 | Frei et al. | |
| 2019/0322507 A1 | 10/2019 | Jiandong | |
| 2020/0331733 A1 | 10/2020 | Jiandong et al. | |

FOREIGN PATENT DOCUMENTS

| | | | | |
|---|---|---|---|---|
| CN | 1522949 | A | 12/2021 | |
| CN | 101128354 | A | 12/2021 | |
| DE | 19601694 | A1 * | 7/1997 | ............... B62B 3/06 |
| DE | 19601694 | C2 * | 11/2001 | ............... B62B 3/06 |
| DE | 102017111941 | A1 * | 12/2018 | |
| DE | 10057402 | A1 | 12/2019 | |
| DE | 102004040342 | A1 | 12/2019 | |
| DE | 102006008037 | A1 | 12/2019 | |
| DE | 102006008038 | A1 | 12/2019 | |
| DE | 102008045731 | A1 | 12/2019 | |
| DE | 102013006721 | A1 | 12/2019 | |
| DE | 10352695 | B4 | 11/2020 | |
| EP | 0751060 | A1 | 12/2019 | |
| EP | 1180473 | B1 | 12/2019 | |
| EP | 2930137 | A1 | 12/2019 | |
| EP | 1867549 | B1 | 12/2021 | |
| FR | 2862040 | B1 | 11/2020 | |
| GB | 811275 | A | 12/2019 | |
| SE | 529638 | C2 | 11/2020 | |
| WO | 9857837 | A1 | 12/2021 | |

\* cited by examiner

TILLER HEAD

CROSS-REFERENCE TO RELATED APPLICATION

The present application is filed under 35 U.S.C. 111(a) as a continuation of International Patent Application No. PCT/CN2021/088760 (CRO 1921 WO), filed Apr. 21, 2021, which international application designates the United States.

TECHNICAL FIELD

The present disclosure relates to a tiller head for an industrial truck. In addition, the technical field relates to a tiller for an industrial truck. Furthermore, the technical field relates to an industrial truck.

BACKGROUND

Industrial trucks are widely used, for example in warehouses and storage facilities. An operator may operate the industrial truck via the tiller head, in particular by operating actuating elements. Further, an operator usually may move and/or steer the industrial truck by pushing and pulling the truck via the tiller at the tiller head. For efficient use, the operator can precisely and easily control the industrial truck regardless of its tiller position. However, the specific arrangement of actuating elements on known tiller heads may limit the freedom of the operator to control the truck, in particular in certain positions of the tiller relative to portions of the industrial truck.

Accordingly, it is desirable to at least address the foregoing. In addition, other desirable features and characteristics will become apparent from the subsequent summary and the detailed description, and the appended claims, taken in conjunction with the accompanying drawings and this background.

SUMMARY

It is the object of the disclosure to provide an improved tiller head as well as to provide an improved tiller and an improved industrial truck.

A first aspect relates to a tiller head for an industrial truck. The tiller head may comprise a central portion, a left handle portion that is attached to a left side of the central portion and a right handle portion that is attached to a right side of the central portion. The right side of the central portion may be opposite to the left side of the central portion. Further, the tiller head may comprise an actuating element. The central portion may have a compartment. The compartment may be at least partially hollow. The compartment may house electronics. The central portion may have a main extension direction, which may correspond to its longest side of extension. The central portion may be formed by at least one injection molded part. For example, the central portion may have two parts that are joined together to form a housing for the electronic components of the tiller head. Each of the left and right handle portions may be formed by at least one injection molded part. Alternatively, the left and right handle portions may also be formed from a metal tube. Each of the left and right handle portions may have a monolithic one-piece construction. For example, the central portion may be glued and/or screwed to the left and right handle portions and/or attached with a positive-locking fit and/or friction fit. The central portion may be attached to both handle portions with at least a snap-on connection. The handle portions may be partially surrounded by the central portion for the attachment. The actuating element may be configured to be operable by an operator, in particular at least by one hand of the operator. For example, the actuating element may be moveable and shaped to be manipulated by a finger. Operation of the actuating element may control functionality of the industrial truck.

The handle portions and the central portion may define a front side of the tiller head and a back side of the tiller head. The back side of the tiller head may be opposite to the front side of the tiller head. For example, the main extension directions of the handle portions may define a plane, which divides the front side of the tiller head from the back side of the tiller head. Alternatively, or additionally, a point of each handle portion furthest from the central portion, in particular in a left-right axis, in combination with the main extension direction of the central portion, may define a plane which defines the front side and back side of the tiller head. The front side of the tiller head and the back side of the tiller head may extend transverse to the left side of the central portion and the right side of the central portion. The front side of the tiller head and the back side of the tiller head may extend perpendicular to the left side of the central portion and the right side of the central portion. Herein, a surface facing in a direction of the front side of the tiller head and/or a surface facing in a direction of the back side of the tiller head may extend transverse, in particular perpendicular, to the left side of the central portion and the right side of the central portion.

The actuating element may have an operable front surface and an operable back surface. The actuating element may have more than one operable front surface and/or more than one operable back surface. The operable front surface of the actuating element may essentially face in the same direction as the front side of the tiller head. The operable back surface of the actuating element may essentially face in the same direction as the back side of the tiller head. Facing in the same direction may be defined as two surfaces and/or sides comprising substantially the same surface normals, in particular comprising substantially the same surface normals in a central and/or main region of the surface/side. A surface may be formed by a physically existing area of an element of the tiller head. The actuating element may be operable by the operator from a front side of the tiller head and from a back side of the tiller head. The operable surfaces may be surfaces being configured for manipulation by the operator, in particular direct manual manipulation. The operable surfaces may be arranged to be accessible by an operator, for example digits of its hand.

The actuating element may be mounted to a front side of the central portion. The front side of the central portion may essentially face in the same direction as the front side of the tiller head. For example, the front side of the tiller head may be defined by the front side, in particular a front surface, of the central portion. A back side of the central portion may face essentially in the same direction as the back side of the tiller head. The back side of the central portion may essentially face in a direction opposite the front side of the central portion. The actuating element may be at least partially arranged at a front side of the central portion, in particular in front of the central portion in a forward-backward direction.

Due to the arrangement of the actuating element and configuration of the tiller head, the tiller head facilitates use of an industrial truck by an operator. In addition, manufacture and assembly of such a tiller head is simple, cost- and time-effective. For example, the tiller head may have a low number of parts, resulting in low costs and a robust design.

According to a further embodiment of the present invention, the tiller head may have a top side and a bottom side. The top side of the tiller head may be opposite to the bottom side of the tiller head. The top side of the tiller head may be opposite to the bottom side of the tiller head with respect to a mid-section of the central portion. The mid-section of the central portion may be framed by the handle portions and/or may be spaced apart from the handle portions. The mid-section of the central portion may be located equidistantly between the top side and the bottom side of the tiller head and/or may be arranged between a top end and bottom end of the central portion. The top side of the tiller head and the bottom side of the tiller head are transversal to the front side of the tiller head and the back side of the tiller head. In particular, the top side of the tiller head and the bottom side of the tiller head may be perpendicular to the front side of the tiller head and the back side of the tiller head. The top side of the tiller head and the bottom side of the tiller head are transversal to the right side of the central portion and the left side of the central portion. In particular, the top side of the tiller head and the bottom side of the tiller head may be perpendicular to the right side of the central portion and the left side of the central portion. The right side of the central portion may essentially face in the same direction as a right side of the tiller head. The left side of the central portion may essentially face in the same direction as a left side of the tiller head. The central portion may have a top surface that essentially faces in the same direction as the top side of the tiller head. The central portion may have a bottom surface that essentially faces in the same direction as the bottom side of the tiller head.

A forward direction may be defined as a direction facing away from the front side of the tiller head and/or as a direction from the back side to the front side of the tiller head. A backward direction may be defined as a direction facing away from the back side of the tiller head and/or as a direction from the front side to the back side of the tiller head. The forward direction may be opposite to the backward direction. A top direction may be defined as a direction facing away from the top side of the tiller head and/or as a direction from the bottom side to the top side of the tiller head. A bottom direction may be defined as a direction facing away from the bottom side of the tiller head and/or as a direction from the top side of the tiller head to the bottom side of the tiller head. The top direction may be opposite to the bottom direction. A right direction may be defined as a direction facing away from the right side of the central portion and/or as a direction from the left side of the central portion to the right side of the central portion. A left direction may be defined as a direction facing away from the left side of the central portion and/or as a direction from the right side of the central portion to the left side of the central portion. The forward-backward axis may be defined as an axis comprising the forward and backward direction. The top-bottom axis may be defined as an axis comprising the top and bottom direction. The left-right axis may be defined as an axis comprising the left and right direction. The forward-backward axis, top-bottom axis and left-right axis may each be arranged perpendicular to each other and thus define a coordinate system for the tiller head and, in particular, for the central portion and/or handle portions.

According to a further embodiment of the present invention, the actuating element may be arranged at the mid-section of the central portion. Such an arrangement allows an operator to easily reach the actuating element with different hand positions. In particular, such an arrangement may facilitate actuation of the actuating element with either a hand grasping the left handle portion or a hand grasping the right handle portion. The mid-section of the central portion may be located in the middle between the front side of the tiller head and the back side of the tiller head. The mid-section may be formed by a recess in the front surface of the central portion or may comprise such a recess. The mid-section of the central portion may be located in between the left side of the central portion and the right side of the central portion, in particular in the middle. The mid-section of the central portion may be located in the middle between the left handle portion and the right handle portion.

According to a further embodiment of the present invention, the actuating element may have a monolithic construction, in particular a one-piece construction. Manufacturing and assembly costs of the tiller head may be low due to the one-piece construction. In particular, the actuating element may be configured as an injection-molded part. An injection-molded part may allow cost-effective manufacturing even with complex geometries. The actuating element may be made of a synthetic material, such as plastic. The actuating element may be made of a metal material, for instance aluminum. The actuating element may, for example, be cast part, forged part and/or machined part in this case. Such a part is very robust while still being cost effective. As another example, the actuating element may be made of a ceramic material. A ceramic actuating element may be very robust and lightweight. In particular, in case the actuating element is made of a metal or ceramic material, the actuating element may be configured as a powder injection-molded part.

According to a further embodiment of the present invention, the actuating element may be a rocking paddle switch actuating element. The rocking paddle switch actuating element may be arranged on the front side of the central portion. The rocking paddle switch actuating element may be configured as an element that is pivotable about a pivot axis. As such, end sections of the rocking paddle switch actuating element may alternatively be moved towards the central portion, in particular at a front side, when actuated. Pivoting the rocking paddle switch actuating element may result in a seesaw-like motion around its pivot axis.

According to a further embodiment of the present invention, the actuating element may comprise a touch sensitive surface. In particular, the touch sensitive surface of the actuating element may be configured to sense being touched by the operator, e.g. with a sensor, such as a touchscreen. Operation of the actuating element may therefore not result in a movement of the actuating element. The actuating element may remain in place relative to the central portion when being operated. For example, the sensor may be one of a resistive sensor, an ultrasonic sensor, a capacitive sensor, or an optical sensor, such as a CMOS sensor. In an embodiment of the invention, the rocking paddle switch actuating element may comprise the touch sensitive surface. The touch sensitive surface may allow detection of additional operation parameters besides rocking of the switch or instead of rocking of the actuating element.

According to a further embodiment of the present invention, the actuating element may extend at the front side of the central portion beyond a left and a right edge of the central portion. The actuating element may extend at the front side of the central portion beyond the edge of the central portion to form the operable back surface of the actuating element. Such a design may facilitate operation of the actuating element by the operator from the back side of the tiller head. The left and right edge of the central portion may define a boundary of the central portion in the left and right direction. The edges may be formed with a sharp angle, a right angle and/or may be formed by a rounded transition zone between the front surface and the left surface of the central portion and the right surface of the central portion, respectively. A left edge and a right edge of the actuating element may extend at the front side of the central portion beyond the left and the right edge of the central portion along a width-wise axis, wherein the width-wise axis and/or horizontal axis may be defined by the left-right axis. In particular, the left and right edge of the actuating element may be arranged closer to the left and right handle portions of the tiller head in the left-right direction than parts of the left and right edges of the central portion directly adjacent to the actuating element. The actuating element may be wider than a section of the central portion directly adjacent thereto. The width-wise axis may also be referred to as the left-right axis. The actuating element may comprise a left operable back surface and a right operable back surface. Such a design may allow equally comfortable actuation of the actuating element by an operator gripping just one handle portion and/or with just one hand, regardless of side. The actuating element may extend at the front side of the central portion beyond a left edge of the central portion to form a left operable back surface and/or beyond a right edge of the central portion to form a right operable back surface.

According to a further embodiment of the present invention, the actuating element may extend towards the back side of the tiller head. In particular, the actuating element may extend along both the left side and the right side of the central portion. Such an arrangement may facilitate mounting of the actuating element to the central portion, in particular, when the actuating element is configured as a monolithic, in particular as a one-piece, construction. Further, such an arrangement may facilitate actuation from both the front side and back side of the tiller head while still allowing a simple actuation element geometry. The actuating element may extend up to or beyond the back side of the central portion. The actuating element may extend symmetrically along both the left side and the right side of the central portion towards the back direction. The actuating element may extend symmetrically along the left and right side of the central portion towards the back side of the tiller head. The actuating element may extend solely towards the back side of the tiller head. A left portion of the actuating element may extend along the left side of the central portion towards the back side of the tiller head. A right portion of the actuating element may extend along the right side of the central portion towards the back side of the tiller head. The left portion of the actuating element may be a portion of the actuating element which is arranged closer to the left side of the central portion than to the right side of the central portion. The right portion of the actuating element may be a portion of the actuating element which is arranged closer to the right side of the central portion than to the left side of the central portion. For example, the left and the right portion of the actuating element may at least partially be arranged adjacent to the left or respectively right side of the central portion. A portion on the back surface of the central portion, which may be opposite to a portion on the front surface of the central portion where the actuating element is mounted and covering said front surface, may be exposed. The actuating element may therefore not cover said back side portion of the central portion, for example unlike a corresponding front side portion of the central portion. In particular, a mid-section of the back side of the central portion may be exposed.

According to a further embodiment of the present invention, the actuating element may be at least partially framed by one of the handle portions and the central portion. Such an arrangement may protect the actuating element from accidental actuation and/or damage, for example due to bumping into an obstacle when moving the industrial truck. With this configuration, the left and right portion of the actuating element and optionally also the central portion may be protected by the left and right handle portion of the tiller head. In particular, a hand of the operator located within the framing provided by the handle portions and operating the actuating element may be protected against unintended physical influence from a left side and/or from a right side of the tiller head, for example by an obstacle. The left portion of the actuating element may at least partially be framed by the left handle portion of the tiller head and the central portion, in particular the left side of the central portion. The right portion of the actuating element may at least partially be framed by the right handle portion of the tiller head and the central portion, in particular the right side of the central portion. For example, the handle portions may completely frame the actuating element in the left-right direction, in particular in a plane defined by the left-right and top-bottom axes. The framing may be in a plane defined by the front and back side of the tiller head. The left and right side of the tiller head may face substantially in the left and right direction, respectively.

According to a further embodiment of the present invention, the actuating element may be pivotable about an axis, which extends between the left side and the right side of the tiller head. Such an arrangement may render actuating element operation very intuitive, in particular if the actuating element controls lowering and raising operation of the industrial truck. The actuating element may be pivotably mounted about an axis. The axis may be a horizontal pivot axis. The pivot axis may extend parallel to the left-right axis. In particular, the rocking paddle switch actuating element may be pivotably mounted about the axis. The pivot axis may be perpendicular to the forward-backward axis. The axis may be perpendicular to the top-bottom axis.

According to a further embodiment of the present invention, each of the operable front surface and the operable back surface of the actuating element may comprise at least a first and a second operable surface portion. The first operable surface portion may allow to operate the actuating element in a first way and the second operable surface portion may allow to operate the actuating element in a second way. The actuating element may therefore allow control of at least two different functions of the industrial truck or one function in two different ways either by operating, in particular pushing, the front or the back surface of the actuating element. Each one of the operable front and back surface may comprise one or more than one first and/or second operable surface portion. More than one operable front surfaces and/or more than one operable back surfaces may comprise one or more first and/or second operable surfaces. Some or all of the operable surface portions on one side, e.g. of one of the operable front and back surfaces, may be arranged adjacent to each other and some or all of the operable surface portions on one side may be arranged spaced apart from each other.

According to a further embodiment of the present invention, the first operable surface portion may be located at a top section of the actuating element at the operable front surface. Alternatively, or additionally, the first operable surface portion may be located at a bottom section of the actuating element at the operable back surface. The top section of the actuating element may be a section of the actuating element which is located above the bottom section along the top-bottom axis. In other words, the top section of the actuating element may be closer to the top side of the tiller head than the bottom section. On the other hand, the bottom section of the actuating element may be closer to the bottom side of the tiller head than the top section.

According to a further embodiment of the present invention, the second operable surface portion may be located at the bottom section of the actuating element at the operable front surface. Additionally, or alternatively, the second operable surface portion may be located at the top section of the actuating element at the operable back surface. With this configuration, the operator may operate the first and the second operable surface portions by operating the operable front surface of the actuating element as well as from the operable back surface of the actuating element.

According to a further embodiment of the present invention, the first operable surface portion may comprise a first marker and/or the second operable surface portion comprises a second marker. In particular, the first marker may be different to the second marker. In an embodiment, each of the first operable surface portions may comprise one first marker and/or each of the second operable surface portions may comprise one second marker. For example, the marker may be formed by indentions and/or protrusions on the respective surface. Additionally, or alternatively, the marker may comprise sections differently colored than adjacent sections of the respective surface and/or with a different surface structure, such as a different and/or an increased roughness. A marker may form a symbol or geometric figure. A marker may be configured to be optically and/or haptically detectable by the operator, for example by being optically or haptically distinguishable from adjacent portions of the respective surface of the actuating element. The first marker may indicate a lifting operation of the industrial truck. The second marker may indicate a lowering operation of the industrial truck. With this configuration, the operator may identify the corresponding operable surface portion of the actuating element for the lifting and lowering operation of the industrial truck. The lifting operation may be a raising operation. Furthermore, with a first marker on the first operable surface portion on the operable front surface of the actuating element as well as a first marker on the first operable surface portion on the operable back surface of the actuating element, the operator may identify the correct operable surface portion for a lifting operation of the industrial truck from the front side of the tiller head as well as from the back side of the tiller head. The operator may identify the second marker on the second operable surface portion on the operable front surface as well as on the operable back surface of the actuating element in order to identify the operable surface portion indicating a lowering operation of the industrial truck from the front side as well as from the back side of the tiller head.

According to a further embodiment of the present invention, the first operable surface portion and the second operable surface portion may be separated from each other by a ridge. The ridge may further help the operator in operating the intended operable surface. The actuating element may have a ridge between each adjacent first and second operable surface portion. The ridge may extend from the left edge of the actuating element to the right edge of the actuating element. The ridge may extend from a left end portion of the actuating element to a right end portion of the actuating element. The ridge may extend substantially in a left-right direction of the tiller head. The ridge may extend parallel to the pivot axis of the actuating element. For example, the ridge may extend in the left-right direction. The ridge may separate the first operable surface portion of the operable front surface of the actuating element from the second operable surface portion of the operable front surface of the actuating element. At least another ridge may separate the first operable surface portion of the operable back surface of the actuating element from the second operable surface portion of the operable back surface of the actuating element.

According to a further embodiment of the present invention, the operable front surface of the actuating element comprises two operable surface portions and the operable back surface of the actuating element comprises four operable surface portions. One of the two operable surface portions of the operable front surface of the actuating element may be a first operable surface portion, in particular located at the top section of the actuating element. One of the two operable surface portions of the operable front surface of the actuating element may be a second operable surface portion, in particular located at the bottom section of the actuating element. For example, the two operable front surface portions are arranged adjacent to each other, possibly separated by a corresponding ridge extending in between. Two of the four operable surface portions on the operable back surface of the actuating element may be two first operable surface portions, in particular at the bottom section of the actuating element. Two of the four operable portions at the back surface of the actuating element may be two second operable surface portions at the top section of the actuating element. For example, a pair of two operable back surface portions, such as a first and second operable portion, are arranged adjacent to each other, possibly separated by a corresponding ridge extending in between. In particular, the actuating element may comprise two pairs of operable back surfaces, in particular, where the two surfaces of one pair of operable back surfaces are arranged adjacent to each other. For example, each of the two first operable surface portions of the operable back surface may be spaced apart from each other, in particular with the central portion arranged in between. For example, each of the two second operable surface portions of the operable back surface may be spaced apart from each other, in particular with the central portion arranged in between.

According to a further embodiment of the present invention, the two operable surface portions at the operable front surface of the actuating element may cover part of the front side of the central portion. In particular, a portion of the two operable surface portions at the operable front surface of the actuating element may cover part of the front side of the central portion. A section of the actuating element comprising the two operable surface portions at the operable front surface of the actuating element may cover part of the left and right side of the central portion. In particular, the left and right portions of the actuating element and hence left and right portions of the two operable portions at the operable front surface of the actuating element may cover part of the left and right side of the central portion.

According to a further embodiment of the present invention, two operable surface portions at the operable back surface of the actuating element may be arranged adjacent to the left side of the central portion. Additionally, or alternatively, two operable surface portions at the operable back surface of the actuating element may be arranged adjacent to the right side of the central portion. In other words, two operable surface portions adjacent to the left side of the central portion may be separated from two operable surface portions adjacent to the right side of the central portion by at least a part of the central portion. This adjacent arrangement may be along the left-right axis. One first and one second operable surface portion at the operable back surface of the actuating element may be arranged adjacent to the left side of the central portion. One first and one second operable surface portion at the operable back surface of the actuating element may be arranged adjacent to the right side of the central portion. With this configuration, the operator may operate the first and second operable surface portion both on the right side and on the left side of the central portion from the back side of the tiller head. The actuating element may thus be easily actuated from the back side of the tiller head with either hand of the operator.

According to a further embodiment of the present invention, the tiller head may be configured for controlling the raising and/or lowering operation of the industrial truck, in particular by operation of the actuating element. The raising operation of the industrial truck may be a lifting of objects transported by the industrial truck and/or a load carrying structure, such as pallet forks. The raising and/or lowering operation of the industrial truck may be effected by an electric motor and/or a hydraulic system. Operation of the actuating element may cause the raising and/or lowering operation of the industrial truck.

According to a further embodiment of the present invention, the tiller head may be configured to detect an actuation of the actuating element. Actuation of the actuating element may be a touching actuation and/or pushing of the actuating element, in particular by the operator. Actuation of the actuating element may be an operation of the actuating element. In particular, actuation of the actuating element may be an actuation and/or operation of at least one of the at least one operable surface portions of the actuating element. For example, the tiller head may comprise one or more sensors to detect movement of the actuating element relative to the central portion, such as a pivoting movement around its pivot axis. A corresponding sensor signal may be received by a microcontroller arranged in the tiller head, in particular the central portion, that controls functions of the industrial truck, such as a raising and/or lowering operation. The microcontroller may generate a control signal to control the electric motor and/or a hydraulic system correspondingly.

According to a further embodiment of the present invention, the tiller head may comprise two microswitches for detection of an actuation of the actuating element. The microswitches may be normally open microswitches. Alternatively, the microswitches may be normally closed microswitches. In a particular embodiment it is possible, that one microswitch is a normally open microswitch and the other microswitch is a normally closed microswitch. Microswitches may be cost- and installation space effective while allowing reliable detection of actuating element movement, in particular when configured as a rocking paddle switch actuating element.

According to a further embodiment of the present invention, the two microswitches may be arranged between the central portion and the actuating element, for example in the forward-backward direction. In particular, the microswitches may be arranged between a front side of the central portion and a back side of the actuating element covering a part of the front side of the central portion and/or being arranged adjacent thereto. The microswitches may be arranged in a straight line, which extends along a direction from the top side of the tiller head to the bottom side of the tiller head. At least one of the central portion and the actuating element may provide at least one recesses for accommodating the two microswitches. In an embodiment, the central portion provides two recesses, wherein each recess houses one microswitch. In another embodiment, the actuating element provides two recesses, wherein each recess houses one microswitch. If a recess is provided in the central portion, the recess may open towards the actuating element, in particular the rocking paddle switch actuating element. If the recess is provided in the actuating element, in particular in the rocking paddle switch actuating element, the recess may open towards the central portion. Herein, the open side of each recess may indicate a facing direction of each recess.

According to a further embodiment of the present invention, the two microswitches may be arranged on opposite sides of the pivot axis of the actuating element. In particular, the two microswitches may be arranged on opposite sides of the pivot axis of the rocking paddle switch actuating element. For example, each microswitch may be arranged underneath each of the two operable front surface portions of the actuating element, wherein underneath can be understood in relation to the backward direction. The pivot axis may be a horizontal axis in an intended mounting of the tiller head to the industrial truck. Opposite sides of the pivot axis may be located with respect to the top-bottom axis, in particular located in a plane defined by the left-right and top-bottom axes that comprises the pivot axis. With this configuration, an actuation of the actuating element, in particular by the operator, about the pivot axis may easily be detected by the two microswitches. For example, an actuation of the actuating element about the pivot axis, which causes the actuating element to rotate in a clockwise direction about the pivot axis, may be detected by a first one of the two microswitches. Actuation of the actuating element which causes a counter-clockwise rotation of the actuating element about the pivot axis may be detected by a second one of the two microswitches. The first microswitch may be located closer to the top side of the tiller head than the second microswitch. The second microswitch may be located closer to the bottom side of the tiller head than the first microswitch. In other words, the first microswitch may be located above the second microswitch along the top-bottom axis. In an example, the operator may actuate the first operable surface portion on the operable front surface of the actuating element, in particular of the rocking paddle switch actuating element, which, in turn, may be detected by the first microswitch. By actuating the second operable surface portion of the operable front surface of the actuating element, the second microswitch may detect the actuation.

According to a further embodiment of the present invention, the operation of the actuating element may be a pushing operation, in particular by selectively pushing one of the operable surface portions. Alternatively, or additionally, the operation of the actuating element may also be a pulling operation. Exemplarily, the operator may push the first operable surface portion on the operable front surface of the actuating element, thereby pushing the actuating element against the first microswitch and closing a corresponding first circuit, in case the first microswitch is normally open. A contact between the first microswitch and the actuating element during actuation may be direct or indirect. For example, due to a pushing operation on the second operable surface portion of the operable front surface of the actuating element, the bottom section of the actuating element may be pushed against the second microswitch, thus closing a corresponding second circuit, in case the second microswitch is normally open. These above-described exemplary operations describe actuations from a front side of the tiller head. In addition, actuations may occur from the back side of the tiller head. By a pushing operation on the first operable surface portion of the operable back surface of the actuating element, the top portion may be pushed against the first microswitch to close the first circuit. By a pushing operation on the second operable surface portion on the operable back surface of the actuating element, the bottom portion of the actuating element may be pushed against the second microswitch to close the second circuit.

According to a further embodiment of the present invention, the tiller head may be configured for returning the actuating element into its initial position after actuation. Such a configuration may prevent unwanted execution of a function of the industrial truck after operation of the actuating element, such as pressing of the actuating element, has been terminated. The initial position of the actuating element may be a steady state position of the actuating element with respect to the central portion. In particular, the initial position may be defined as a substantially parallel arrangement of the actuating element with respect to the central portion, wherein the front side of the central portion and the operable front surface are positioned substantially parallel to each other. The initial position may also alternatively or additionally be defined as a position where the actuating element is not operated by an operator and/or where the microswitches are not pressed by the actuating element and/or where the first and second circuit are both in an open state, in case of normally open microswitches. The tiller head may be configured for returning the actuating element into its initial position by exerting a restoring force on the actuating element.

According to a further embodiment of the present invention, at least one spring element may be arranged on each side of the pivot axis of the actuating element for providing the restoring force on the actuating element. In particular, at least one spring element is arranged on each side of the pivot axis of the rocking paddle switch actuating element for providing a restoring force on the rocking paddle switch actuating element. For example, each spring may be similarly arranged as one of the microswitches, in particular arranged adjacent to each microswitch. The spring element may be made from a rubber or metal material. In particular, a rocking paddle switch of the tiller head may comprise the rocking paddle switch actuating element being pivotably mounted to the central portion and the two spring elements.

According to a further embodiment of the present invention, the two handle portions may be arranged symmetrically relative to the central portion. Herein, symmetrical arrangement may be relative to a symmetry plane. This symmetry plane may be defined by the forward-backward and top-bottom direction. The symmetry plane may extend through a middle of the central portion in a left-right direction. A symmetric configuration may allow the use of identical parts. For example, the left and right handle portions may be identical parts.

According to a further embodiment of the present invention, the two handle portions may be U-shaped, wherein each handle portion comprises a first end and a second end. The thickness of each handle portion may vary along the U-shaped extension of the handle portions or may be constant. Each of the handle portions may comprise a first and a second leg, wherein the first leg comprises the first end and the second leg comprises the second end of each handle portion. The first and the second leg may be connected to each other at the bottom of each of the U-shaped handle portions with a bottom portion. The bottom portion of the U-shaped handle portions may be spaced apart from the central portion and the legs may face towards the central portion from the bottom portion, in particular along the left-right axis.

According to a further embodiment of the present invention, the first end of each handle portion may be attached to a bottom section of the central portion. The bottom section of the central portion may be arranged closer to the bottom side of the tiller head than the bottom section of the actuating element. The first end of the left handle portion may be attached to the left side of the bottom section of the central portion. The first end of the right handle portion may be attached to the right side of the bottom section of the central portion. For example, each attachment of the handle portion to the central portion may be direct and may be provided with a glued joint, a screwed joint, a friction fit, a snap-on connection or the like.

According to a further embodiment of the present invention, the second end of each handle portion may be attached to a top section of the central portion. The top section of the central portion may be arranged closer to the top side of the tiller head than the top section of the actuating element. The second end of the left handle portion may be attached to the left side of the top section of the central portion. The second end of the right handle portion may be attached to the right side of the top section of the central portion. The attachment of the second end of each handle portion may be a direct and/or an indirect attachment to the central portion at the top section of the central portion. In an embodiment, one of the first and second ends of one handle portion may be attached directly, while the other end of said handle portion may be attached indirectly. For example, one end of each handle portion may be attached to the central portion via a further actuating element arranged in between, such as a rotating actuating element. Such a design may be very compact.

According to a further embodiment of the present invention, the tiller head comprises at least one further actuating element. The further actuating element may be configured for operation by the operator, for example by pushing or rotating the further actuating element. The further actuating element may, for example, be at least one of a button, a touch-sensitive actuating element, or a rocking paddle switch actuating element. In particular, the at least one further actuating element may be arranged on the central portion and/or one of the handle portions.

According to a further embodiment of the present invention, one of the at least one further actuating element may be arranged at a top end of the central portion. The further actuating element may be a belly button. The top end of the central portion with the further actuating element mounted thereto may correspond to the top end of the tiller head. The actuating element may be operated by the operator by being pushed downwardly, wherein such downward actuation movement is substantially along the top-bottom axis. The further actuating element may be configured as a push button in this case.

According to a further embodiment of the present invention, one of the at least one further actuating element may be arranged at the top section and on the front side of the central portion. This further actuating element may be located closer to the top side of the tiller head than the actuating element. The further actuating element and the actuating element may be spaced apart on the central portion. The top front section of the central portion may comprise a protruding section protruding in the front direction, in particular, beyond the actuating element. The further actuating element may be arranged within the protruding section of the top section on the front side of the central portion. The protruding section may have a concave part where the further actuating element is arranged. The further actuating element may be arranged closer towards the bottom side of the protruding section than to the top side of the protruding section. The further actuating element may face in a front-bottom direction. The further actuating element may be a pushable actuating element, in particular a push button or push switch.

According to a further embodiment of the present invention, one of the at least one further actuating element may be configured to actuate a horn, to provide an emergency shutoff, an emergency break and/or a reversing functionality. In one embodiment, the one further actuating element arranged at the top end of the central portion may be one of the emergency shut-off, the emergency break, and a reversing button. The further actuating element arranged at the top section and on the front surface of the central portion may be a horn button. The further actuating element may be a reversing button. The industrial truck may be operable in a walking or pedestrian mode, wherein the further actuating element may be an auto-reverse safety switch, wherein the industrial truck will advance away from the operator when operated. The industrial truck may be operable in a riding mode, wherein the further actuating element may be a brake button and the industrial truck will stop in case the operator actuates the brake button. The industrial truck may comprise a foldable operator's platform, wherein the industrial truck may be operable in a walking mode when the platform is folded up, and the industrial truck may be operable in a riding mode when the platform is folded down.

According to a further embodiment of the present invention, two of the at least one further actuating element may be rotating actuating elements. Rotation of the rotating actuating elements may be about rotation axes, in particular about coaxial rotation axes. Each rotation axis may extend coincide with a central longitudinal axis of the corresponding rotating actuating element, in particular along the left-right axis. Each of the two rotating actuating elements may be configured to be operated by a thumb of the operator, in particular while grasping an adjacent handle portion. Operation of the rotating actuating elements may control acceleration and/or deceleration of the industrial truck, for example by controlling power provided to an electric drive motor. Speed control may be very intuitive with such a design. Further, accidental acceleration of the industrial truck with the operator not grasping the tiller head may be avoided. For example, the tiller head may be configured for returning the rotating actuating elements into their initial positions after actuation.

According to a further embodiment of the present invention, one of the two further actuating elements, in particular configured as a rotating actuating element, may be arranged between the central portion and the left handle portion and another one of the two further actuating elements, in particular configured as a rotating actuating element, is arranged between the central portion and the right handle portion, in particular between the central portion and the respective second ends of each of the left and right handle portions. Each corresponding handle portion may be attached to the central portion via the further actuating element arranged in between. Alternatively, each of the second ends of the two handle portions may not be in direct contact with the two further rotating actuating elements. In other words, there may be a gap between the second end of the left handle portion and the left of the two further actuating elements and there may be a gap between the second end of the right handle portion and the right of the two further actuating elements. The operator holding the tiller head by holding the left handle portion with his left hand and the right handle portion with his right hand may actuate each of the two rotating actuating elements with one thumb and/or index finger. Hence, controlling the acceleration and/or deceleration of the industrial truck by the operator is facilitated without requiring the operator to release the handle portions when actuating the rotating actuating elements.

According to a further embodiment of the present invention, the tiller head further comprises an access control device which is configured to confirm the operator's right to use the industrial truck. The access control device may comprise computing means, such as a microcontroller, for example configured to control the confirmation of the operator's right to use the industrial truck. The access control device may comprise a non-volatile memory, which may have stored thereon information regarding at least one operator's right to use the industrial truck. Additionally, or alternatively, the access control device may be communicatively coupled to a server, which may have stored thereon information regarding at least one operator's right to use the industrial truck. The computing means may be configured to receive said information regarding at least one operator's right to use the industrial truck and may further be configured to confirm the operator's right to use the industrial truck based on said information. Advantageously, only eligible operators may have the right to use the industrial truck. Unwanted use of the industrial truck by unauthorized persons may be prevented by the access control device.

According to a further embodiment of the present invention, the access control device is configured to allow use of a function of the industrial truck in response to the confirmation of the operator's right to use the industrial truck, in particular a function controlled by the tiller head. By allowing the use of the function of the industrial truck, usage of said function by the operator may be enabled. For instance, after allowing use of the function, the operator may press a button on said industrial truck, in particular on said tiller head, which may cause the button's associated functionality to be executed. By comparison, when said button is pressed before the access control device allowed using said functionality, in particular before the access control device confirmed the operator's right to use the industrial truck, said functionality will not be executed upon pressing the button. Instead, an error signal may be given out by the access control device, for example on a display and/or by a loudspeaker of the tiller head. Alternatively, when the operator's right to use the industrial truck has not been confirmed, the industrial truck cannot react to the press of said button at all. The access control device may be configured to allow use of the function depending on which operator's right to use the industrial truck has been confirmed. For example, a first operator may be allowed to use a first set of functions and a second operator may be allowed to use a second set of functions, wherein the two sets may be different to each other by a function and/or settings of a certain function. For example, the first operator may be allowed to only use a driving function but not a lifting function of the industrial truck. By comparison, the second operator may be allowed to use both the driving function and the lifting function and/or drive the truck at a higher speed than the first operator. Advantageously, usage of difficult functionalities of the industrial truck and/or functionalities that require a special license may be limited to certain operators, preferably operators trained and/or certified to use specific functionalities of the industrial truck.

According to a further embodiment of the present invention, the access control device is configured to power-up a component, such as the electric drive motor or load carrying means of the industrial truck, in particular to power-up the component in response to the confirmation of the operator's right to use the industrial truck. The computing means of the access control device may control power control means, such as an ECU and/or a power MOSFET, to power-up the component, in particular to enable a power supply by a battery of the industrial truck for said component. The access control device may be configured to power-up the component in response to the confirmation of the operator's right to use the industrial truck and in response to the usage of the function by the operator. Hereby, a powered status of one or more to be powered-up components in response to the confirmation of the operator's right to use the industrial truck may be decreased, thus saving stored energy in the industrial truck's energy storage, e.g. the battery.

According to a further embodiment of the present invention, the access control device is configured to confirm the operator's right to use the industrial truck via a key, an RFID-chip, such as a dongle, a PIN code, and/or biometric property, such as a finger print. Hereby, the access control device may identify and/or authenticate the operator. Exemplarily, each operator is assigned a corresponding RFID-chip. By confirming the operator's right to use the industrial truck via the RFID-chip, the access control device may identify which operator is being authenticated using the functionalities of the industrial truck. Each key, RFID-chip, PIN code and/or biometric property may be associated with a specific operator, allowing their identification by the access control device and allowing custom access to a corresponding set of functions.

An aspect of the present invention relates to an industrial truck access system comprising the tiller head with the access control device and a key and/or an RFID chip. The access system may comprise a tiller head according to the first aspect, a tiller according to the second aspect described below and/or to an industrial truck according to a third aspect described below. Accordingly, the access system may comprise the features, embodiments and advantages of those aspects.

According to a further embodiment of the present invention, the access control device comprises a user interface device, wherein the user interface device is in particular arranged at the bottom section of the central portion and/or the back side of the tiller head. The access control device may be configured to confirm the operator's right to use the industrial truck based on information received via the user interface device. The access control device may be configured to inform the operator about the confirmation of the operator's right to use the industrial truck via the user interface device. By arranging the user interface device at the bottom section of the central portion of the tiller head, the operation of other buttons, in particular arranged at the upper and/or mid-section of the tiller head, may not be affected, thus avoiding unintended operation of said buttons when the operator confirms his right to use the truck. By arranging the user interface device on the back side of the tiller head, easy accessibility is provided for the operator standing behind the tiller head, with the tiller in an upward and/or standing state. Advantageously, user friendliness may be improved by the user interface device.

According to a further embodiment of the present invention, the user interface device comprises a display, which is configured to display at least a state of at least one functionality of the industrial truck. The display may be configured to display the confirmation of the operator's right to use the industrial truck. In response to the confirmation of the operator's right to use the industrial truck, the display may be configured to display allowed functions of the industrial truck, which may be used by the operator, and/or just generally that the right to use the truck has been confirmed.

According to a further embodiment of the present invention, the user interface device comprises an RFID-reader, a locking cylinder, a biometric scanner, such as a fingerprint scanner, an input device, such as a keyboard, a touchscreen, and/or a keypad. The user interface device may comprise any one and/or any combination of said devices, and the access control device may be configured to confirm the operator's right to use the industrial truck based on information received via said devices and/or via any combination of said devices. The user interface device may comprise an RFID-reader and a keypad, wherein the confirmation of the operator's right may be completed after approaching the RFID-reader with the RFID-chip and entering the PIN in the keypad. Alternatively, or additionally, the confirmation of the operator's right may be completed by inserting and switching a key in the locking cylinder. Advantageously, the user may be allowed to use the function in response to the confirmation. The access control device may be configured such that the confirmation is withdrawn when the user carrying the RFID-chip leaves the vicinity of the RFID-reader, thereby increasing operation safety of the industrial truck.

According to a further embodiment of the present invention, the front side of a front portion of the central portion is set back further in the backward direction in the mid-section thereof than the front side of the front portion in the bottom section and/or the top section. At least parts of the front side of the front portion may be further set back in the backward direction in the mid-section than the complete front side of the front portion in the bottom section and/or top section. The central portion may be formed by the front portion and a back portion. In other words, the front side of the central portion may be formed such that when moving along the front side from the bottom section and/or from the top section to the mid-section and when viewed from the left side of the tiller head, the front side may at least partially extend towards the backward direction. When moving along the front side from the mid-section to the top section and/or bottom section, the front side may at least partially extend towards the forward direction when viewed from the left side. When viewed from the left side of the tiller head, the front side of the central portion may form a bend curvature. Such a geometry of the central portion allows an ergonomic placement of the actuating element.

According to a further embodiment of the present invention, the front side of the front portion of the central portion comprises the recess in the mid-section, wherein the actuating element is mounted in the recess, such that the operable front surface of the actuating element is further set back in the backward direction than the front side of the front portion in the bottom section and/or the top section. A major part of or the complete operable front surface of the actuating element may be further set back in the backward direction than the complete front side of the front portion in the bottom section. A major part of or the complete operable front surface of the actuating element may be further set back in the backward direction than the complete front side of the front portion in the top section. The complete operable front surface of the actuating element may be further set back in the backward direction than a plane comprising a section of the front side of the front portion in the bottom and top section, which are located furthest in the forward direction. With such a design, the operable surfaces of the actuating element may be arranged such that they are comfortable to actuate by an operator holding the tiller head by its handle portions.

According to a further embodiment of the present invention, at least a part of the operable front surface of the actuating element is further set back in the backward direction than a plane comprising the middle of the first ends and the middle of the second ends of both handle portions. Herein, the middle of the first and second ends of the handle portions may be defined by the geometric centers of the first and second ends of the handle portions when viewed within the plane defined by the forward-backward and top-bottom axes. A major part of or the complete operable back surface of the actuating element may be further set back in the backward direction than said plane comprising the middle of the first and second ends of both handle portions. Advantageously, by such positioning of the operable front surface of the actuating element relative to the handle portions, the operator may, when gripping the handle portions, operate the operable front surface with fingers directing rather in the backward direction. Hence, the lever of the operating fingers is effectively shorter compared to operation with fingers positioned perpendicular to the direction of operational force, which is approximately parallel to a normal direction of the operable front surface of the actuating element. Hence, less force is necessary for operating the actuating element from the front side. Thus, operation of the operable front surface may be simplified. Furthermore, by setting most of the operable back surface of the actuating element further back in the backward direction, operation of all functionalities of the tiller head may be improved. The operator may easily operate the operable back surface of the actuating element while gripping the handle portions, as the operable back surface is, due to the relative positioning of the actuating element with respect to the handle portions, closer to the back side of the tiller head. In addition, by arranging the actuating element such that at least a part of the operable front surface of the actuating element is further set back in the backward direction than a plane comprising the middle of the first ends and the middle of the second ends of both handle portions, the arrangement may take into account that an index finger of a human hand is usually longer than a thumb. Hence, the operable front surface is still easy to actuate by the index finger while the operable back surface is comfortable to reach with the thumb.

According to a further embodiment of the present invention, the actuating element may be configured to be operable with an index finger from the front side of the tiller head, wherein the corresponding hand holds one of the two handle portions. The hand holding one of the two handle portions may be an operator's hand. In particular, the actuating element may be operable with the index finger from the front side of the tiller head without release of the hold on the corresponding handle portion by the corresponding hand. Exemplarily, the operator holding the right handle portion with his right hand may operate the operable front surface of the actuating element with his right index finger, in particular the operable front surface of the rocking paddle switch actuating element. The operator may operate the first and/or the second operable surface portion of the actuating element, in particular of the rocking paddle switch actuating element. Same may hold for the left handle portion, vice versa. With this configuration, the operator may control the tiller head and thus steering of the industrial truck, in particular by grasping the handle portions with his hands, while simultaneously also controlling the operation of the actuating element.

According to a further embodiment of the present invention, the actuating element may be configured to be operable with a thumb from the back side of the tiller head, wherein the corresponding hand holds one of the two handle portions. The hand holding one of the two handle portions may be an operator's hand. For instance, the operator may hold the left handle portion with his left hand and may operate the actuating element, in particular the operable back surface of the actuating element, with this left thumb from the back side of the tiller head. Alternatively, or additionally, the operator may hold the right handle portion with his right hand and may operate the actuating element, in particular the operable back surface of the actuating element, with his right thumb from the back side of the tiller head. The operator may operate the first and/or second operable surface portion of the actuating element, in particular of the rocking paddle switch actuating element. The operator holding the right handle portion with his right hand and the left handle portion with his left hand may operate all of the actuating elements of the tiller head while holding the handle portions.

The operator may thus operate the actuating element either from the front or back side while maintaining his grip on the handle portion with the hand used for actuating element actuation. This allows the operator to conveniently and correctly actuate the actuating element, thus controlling the linked function of the industrial truck, in any tilt position of the tiller bar of the industrial truck with the tiller head attached thereto.

According to a further embodiment of the present invention, the tiller head may be configured to be mounted at a first end of a tiller bar, in particular wherein the central portion is configured to be mounted to the first end of the tiller bar and/or wherein the two handle portions are configured to be mounted to the first end of the tiller bar. Mounting the tiller head at the first end of the tiller bar may comprise at least one of gluing, welding, screwing, and plugging the tiller head to the first end of the tiller bar. The central portion may be permanently attached to the tiller bar, for example with a glued connection, welded connection, screwed connection, friction fit or snap-on connection. The tiller bar may substantially be a bar having a main extension direction. By mounting the tiller head to the first end of the tiller bar, mechanical and/or electric and/or electronic connection between the tiller head, in particular the central portion and/or actuating elements of the tiller head, and the tiller bar may be established. For example, the two handle portions may be attached only or additionally to the central portion via the tiller bar. Attachment of the two handle portions to the tiller bar may allow the tiller to withstand large steering forces. Also, resistance to deformation when manually pulling and/or pushing the industrial truck via the tiller may be increased.

According to a further embodiment of the present invention, the central portion of the tiller head may form an extension of the tiller bar. In particular, the central portion of the tiller head may form an essentially straight extension of the main extension of the tiller bar, in particular at least with the bottom section of the tiller head. In other words, the main extension direction of the central portion of the tiller head and the main extension direction of the tiller bar may be essentially coaxial to each other.

According to a further embodiment of the present invention, the bottom section of the central portion may be attached to the first end of the tiller bar. Attaching the bottom section of the central portion to the first end of the tiller bar may comprise a mounting and/or an arranging of the bottom section of the central portion to the first end of the tiller bar. For example, the bottom side of the central portion may have a recess configured to receive a corresponding first end of the tiller bar. The attachment of the bottom section of the central portion to the first end of the tiller bar may be permanent for a particular reliable connection. The attachment of the bottom section of the central portion to the first end of the tiller bar may be releasable for ease of maintenance and/or for tiller head exchange, for example in case of an upgrade.

A second aspect relates to a tiller for an industrial truck. The tiller may comprise a tiller head and a tiller bar, wherein the tiller head is attached to the tiller bar. The tiller head may be configured as a tiller head according to the first aspect. Accordingly, the tiller according to the second aspect may comprise the features, embodiments and advantages of the tiller head according to the first aspect. The tiller head may be attached at a bottom side of the tiller head to a top side of the tiller bar. In particular, the tiller head may be attached to the first end of the tiller bar. The tiller head may be mounted to the tiller bar. Attaching the tiller head to the tiller bar may be accomplished by gluing, welding, screwing and/or sticking the tiller head to the tiller bar, in particular to the first end of the tiller bar. The central portion of the tiller head may be attached to the first end of the tiller bar, in particular by welding, gluing, and/or screwing. The handle portions may be attached to the first end of the tiller bar, in particular, by welding, gluing and/or screwing.

According to a further embodiment of the present invention, the tiller bar may be configured to be pivotable about a horizontal pivot axis, in particular, wherein a second end of the tiller bar is configured to be pivotably mounted to the industrial truck. The horizontal pivot axis may be arranged parallel to the left-right axis. For example, the horizontal pivot axis of the tiller may be arranged parallel to the pivot axis of the actuating element of the tiller head. The second end of the tiller bar may be an opposing end with respect to the first end of the tiller bar. The second end of the tiller bar may be arranged at the horizontal pivot axis. The tiller bar may extend perpendicular to the horizontal pivot axis of the tiller.

According to a further embodiment of the present invention, the second end of the tiller bar may be configured as part of a joint providing the pivotable mounting of the tiller to the industrial truck. The joint may provide at least the horizontal tiller bar pivot axis. For example, the second end of the tiller bar may comprise a trough hole for receiving a pin to pivotably fasten the tiller bar to the industrial truck. As another example, the second end of the tiller bar may comprise a pin-like structure to pivotably fasten the tiller bar to the industrial truck. The joint may be a knee joint. The joint may be a ball joint or a spherical joint. The range of motion of the ball joint or the spherical joint may be restricted in order to provide a range of motion substantially identical to the range of motion of a knee joint. The second end of the tiller bar may comprise parts or even the complete joint.

According to a further embodiment of the present invention, the tiller comprises an access control device which is configured to confirm the operator's right to use the industrial truck. Said access control device may be configured as the access control device of the tiller head according to the first aspect. However, it may also be an additional and/or different access control device. The access control device of the tiller may comprise a user interface device arranged on the tiller bar. Said user interface device may be configured as the user interface device of the tiller head according to the first aspect. However, it may also be an additional and/or different user interface device. For example, the industrial truck may comprise two user interfaces for access control devices, one arranged on the tiller head and one on the tiller bar. The two user interface devices may provide different access methods as alternatives.

The user interface device of the tiller may comprise any of the components described for the user interface device of the tiller head according to the first aspect. In particular, the user interface device of the tiller may comprise a locking cylinder, wherein the locking cylinder may be arranged on the tiller bar. According to another embodiment of the invention, the locking cylinder may be part of the tiller head's user interface device and may thus be arranged on the tiller head. The locking cylinder may be unlockable by one or more keys, for example with a turning motion. These keys may be part of the user interface device. With the key, a user may gain access to using the industrial truck with such a tiller. The tiller bar may easily provide sufficient space for such a locking cylinder.

The user interface device may comprise a keyhole of the locking cylinder, which may be arranged on a protrusion of the tiller bar. Herein, the protrusion may extend from a back side of the tiller bar and may face in the top-backward direction. Followingly, the keyhole may also face in the top-backward direction and may be easily accessible by the operator with the tiller in the standing state. The locking cylinder may form the user interface device. The tiller head may be free of additional user interfaces, such as a keypad, locking cylinder, display or biometric sensor, and the access control device may comprise no further parts. Such a design may be very cost-effective. Alternatively, the tiller head may comprise an additional user interface device, for example comprising at least one of an RFID-reader, a keypad, a display, or a biometric sensor. Such an additional user interface may be arranged on the tiller head, as described above. The access control device therefore may comprise two or more user interfaces. The user may easily be allowed to use a function of the industrial truck by inserting a key into the keyhole of the tiller's access control device and/or by using any of the provided user interface devices of the access control device of the tiller head. All directions are defined by the tiller head according to the first aspect mounted to the tiller bar, in particular sides of the tiller bar.

A third aspect relates to an industrial truck. The industrial truck may comprise the tiller according to the second aspect and/or the tiller head according to the first aspect. Accordingly, the industrial truck according to the third aspect may comprise the features, embodiments and advantages of the tiller head according to the first aspect and/or the tiller according to the second aspect. The tiller and/or the tiller head may be mounted to a body of the industrial truck. The tiller head and/or the tiller may be configured for controlling the industrial truck, in particular for steering the industrial truck and/or for controlling the lifting operation. The lifting operation may be a lifting operation of load carrying means. The body of the industrial truck may comprise an electronic control unit, an energy storage unit, a motor, in particular an electric drive motor, means for reloading and/or refilling the energy storage unit, a hydraulic system, and/or a cooling system. The tiller of the industrial truck may be configured for controlling the steering of the industrial truck. The tiller head may be configured for controlling the lifting operation of the industrial truck, in particular due to actuation of the actuating element.

According to a further embodiment of the present invention, the industrial truck comprises load carrying means, which may comprise a fork-like structure. For example, the fork-like structure may be configured for receiving a pallet. The industrial truck may comprise a front end and a back end. Herein, the tiller bar may be arranged closer to the back end of the industrial truck than to the front end of the industrial truck. The fork-like structure of the industrial truck may substantially extend along a direction from the back end of the industrial truck towards the front end of the industrial truck. The fork-like structure may comprise two fork teeth. The industrial truck may be configured as a pallet truck.

According to a further embodiment of the present invention, the industrial truck may be configured to be operated by a nearby walking operator. Alternatively, or additionally, the industrial truck may be configured to be operated by a riding operator from a standing and/or seating platform of the industrial truck. The industrial truck may be configured as a walking pallet truck. In the walking mode, a platform of the truck may be folded up, preferably in a top-bottom direction of the industrial truck. In a riding mode, the platform may be folded down, for example by pivoting around a pivot axis of the platform extending parallel to the left-right axis. At least one of the actuating and further actuating elements of the tiller head, in general, of the industrial truck, may control a first functionality of the industrial truck in the walking mode, wherein said actuating element may control a second functionality in the riding mode. The industrial truck may also be configured solely as a walking industrial truck and therefore lack any platform or seat configured for the transport of an operator.

According to a further embodiment of the present invention, the tiller may be adjustable, in particular between a first and a second state, wherein the first state is the upward and/or standing state and the second state is a pivoted and/or walking state. In particular, the tiller bar may be pivoted between the first and the second state, for example by being pivoted about the joint at its second end attaching the tiller bar to the truck body. The tiller may be configured to be manually adjustable by the operator. In the first state, the tiller bar may be arranged substantially perpendicular to the fork-like structure of the industrial truck and/or extend in an essentially vertical direction. In the second state, the tiller bar may be pivoted such that an angle between the fork-like structure and the tiller bar may be greater than 90° and/or to extend transverse to an essentially vertical direction. The first state may facilitate use of the industrial truck in tight spaces. The second state may facilitate steering and overall control of the industrial truck while moving around, in particular at higher speeds. In each state, the operator may easily actuate the actuating element at least from one side of the tiller head while operating the industrial truck.

According to a further embodiment of the present invention, in the first state, the front side of the tiller head essentially may face away from the operator. For example, in the first state, the front side of the tiller head may face essentially towards the truck body and/or the fork-like structure. In the first state, the back side of the tiller head may essentially face towards the operator and/or away from the truck body and/or the fork-like structure.

According to a further embodiment of the present invention, in the second state, the front side of the tiller head may face in the upward direction. The upward direction may be relative to the ground the industrial truck is positioned on. In the second state, the back side of the tiller head may face in a downward direction, in particular towards the ground.

A fourth aspect relates to an industrial truck comprising a tiller head configured for controlling the industrial truck. The tiller head according to this aspect may comprise a central portion, a left handle portion that is attached to a left side of the central portion and a right handle portion that is attached to a right side of the central portion, which is opposite to its left side, and an actuating element. The handle portions and the central portion may define a front side of the tiller head and a back side of the tiller head, which is opposite to its front side. The front side of the tiller head and the back side of the tiller head may extend transverse to the left side of the central portion and the right side of the central portion. The actuating element may have an operable front surface and an operable back surface. The actuating element may be mounted to a front side of the central portion. The tiller head controlling the industrial truck according to the fourth aspect may be configured as the tiller head according to the first aspect and/or have some or all of the features of the tiller head according to the first aspect.

According to a further embodiment of the present invention, the industrial truck and the actuating element may be configured such that truck functionality controlled by the operable front surface is at least partially identical to truck functionality controlled by the operable back surface. An operator is thus free to choose whether to control such a truck functionality by actuating the operable front surface or operable back surface. The operator may thus choose which of the operable front surface and operable back surface to use according to tiller position and his or her position, rendering use more comfortable and intuitive. A truck functionality may, for example, relate to control and use of the industrial truck. For example, a truck functionality may be a driving function, such as forward and/or backwards driving, and/or a fork control function, such as a raising and/or lowering operation, in particular hydraulic raising and/or lowering of a fork.

According to a further embodiment of the present invention, the operable front surface portion of the actuating element may comprise a first operable front surface portion and a second operable front surface portion. Additionally or alternatively, the operable back surface portion of the actuating element may comprise a first operable back surface portion and a second operable back surface portion. This may allow to control the same truck functions with the actuating element both from the front and back side, in particular with an identical or similar actuation by an operator. For example, the industrial truck and the actuating element may be configured such that truck functionality controlled by a first operable front surface portion of the actuating element is identical to truck functionality controlled by one of a first and second operable back surface portions and such that that truck functionality controlled by the second operable front surface portion is identical to truck functionality controlled by the other of the first and second operable back surface portions.

According to a further embodiment of the present invention, the industrial truck and the actuating element may be configured such that truck functionality controlled by an operable front surface portion located at a top section of the operable front surface is identical to truck functionality controlled by an operable back surface portion located at a bottom section of the operable back surface and such that truck functionality controlled by an operable front surface portion located at a bottom section of the operable front surface is identical to truck functionality controlled by an operable back surface portion located at a top section of the operable back surface. Such a configuration allows the use of a simple rocking paddle switch as the actuating element, for example with one pivot axis and simple sensors and/or switches to detect actuation. Further, such a configuration renders control intuitive for the operator depending on tiller pivot position.

For example, in an embodiment of the present invention, the tiller head and the industrial truck may be configured according to the following features. The operable front surface portion of the actuating element comprises a first operable front surface portion and a second operable front surface portion. The actuating element extends at the front side of the central portion beyond a left edge of the central portion to form a left operable back surface and beyond a right edge of the central portion to form a right operable back surface. The left operable back surface of the actuating element comprises a first operable back surface portion and a second operable back surface portion. The right operable back surface of the actuating element comprises a first operable back surface portion and a second operable back surface portion. The industrial truck and the actuating element are configured such that truck functionality controlled by the first operable front surface portion is identical to truck functionality controlled by one of the first and second operable back surface portions of the left operable back surface, the right operable back surface, or both, and such that that truck functionality controlled by the second operable front surface portion is identical to truck functionality controlled by the other of the first and second operable back surface portions of the left operable back surface, the right operable back surface, or both.

A fifth aspect relates to a tiller head comprising a central portion, a left handle portion, a right handle portion, and an actuating element. The left handle portion may be attached to a left side of the central portion. The right handle portion that may be attached to a right side of the central portion, which is opposite to its left side. The handle portions and the central portion may define a front side of the tiller head and a back side of the tiller head, which is opposite to its front side. The front side of the tiller head and the back side of the tiller head may extend transverse to the left side of the central portion and the right side of the central portion. The actuating element may have an operable front surface and an operable back surface. The actuating element may be mounted to a front side of the central portion. The tiller head according to the fifth aspect may be configured as the tiller head according to the first aspect and/or have some or all of the features of the tiller head according to the first aspect.

Additional features and advantages may be gleaned by the person skilled in the art from the following description of exemplary embodiments, drawing reference to the attached drawings. The embodiments as shown and described are exemplary embodiments only and shall not be construed as limiting the invention, which is defined by the appended claims.

BRIEF DESCRIPTION OF THE DRAWINGS

Embodiments of the present invention will hereinafter be described in conjunction with the following drawings, wherein like numerals denote like elements.

DETAILED DESCRIPTION

Figure 1:
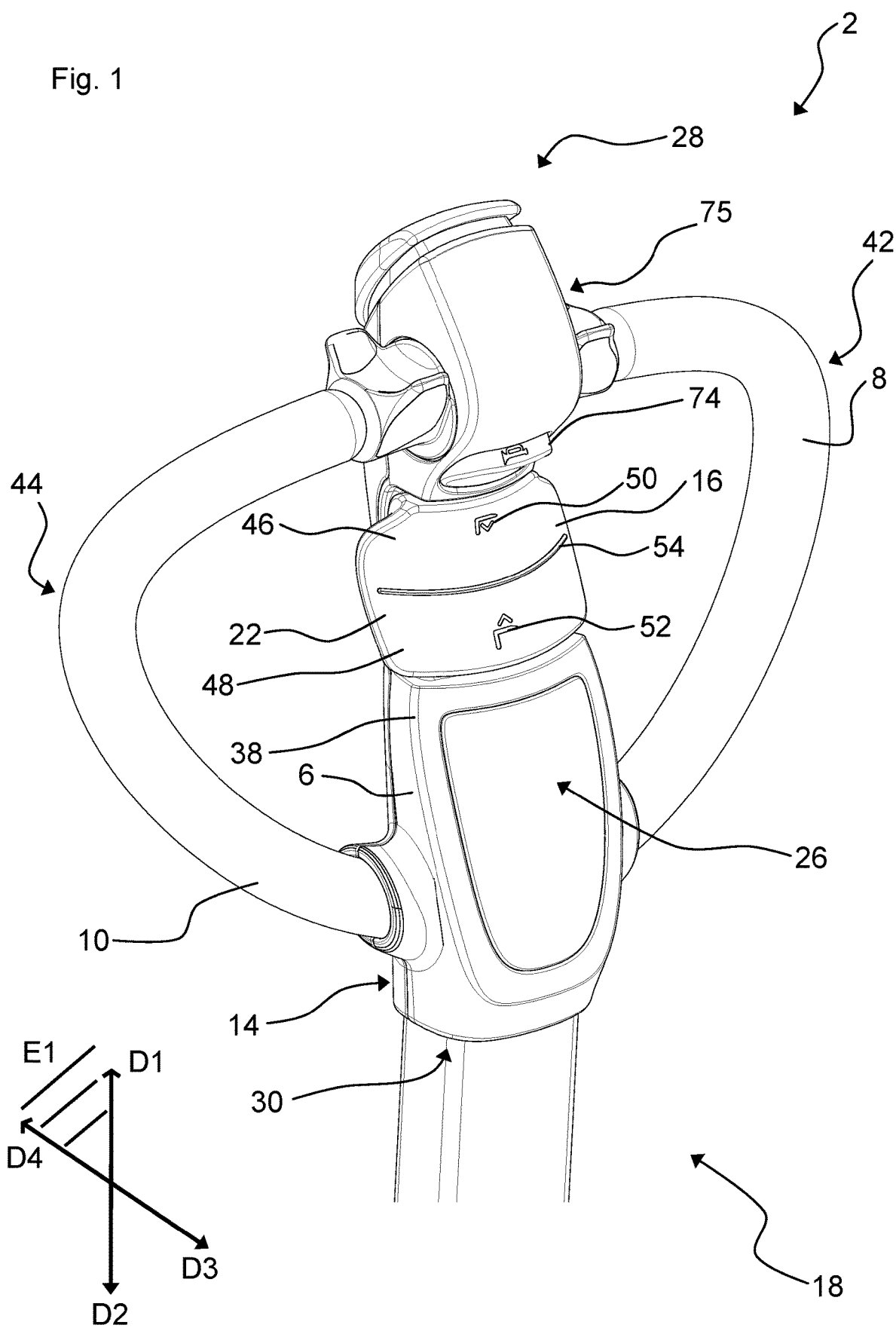
FIG. 1 shows a perspective view of a tiller head from above and a front side of the tiller head, wherein the tiller head comprises an actuating element.
Figure 2:
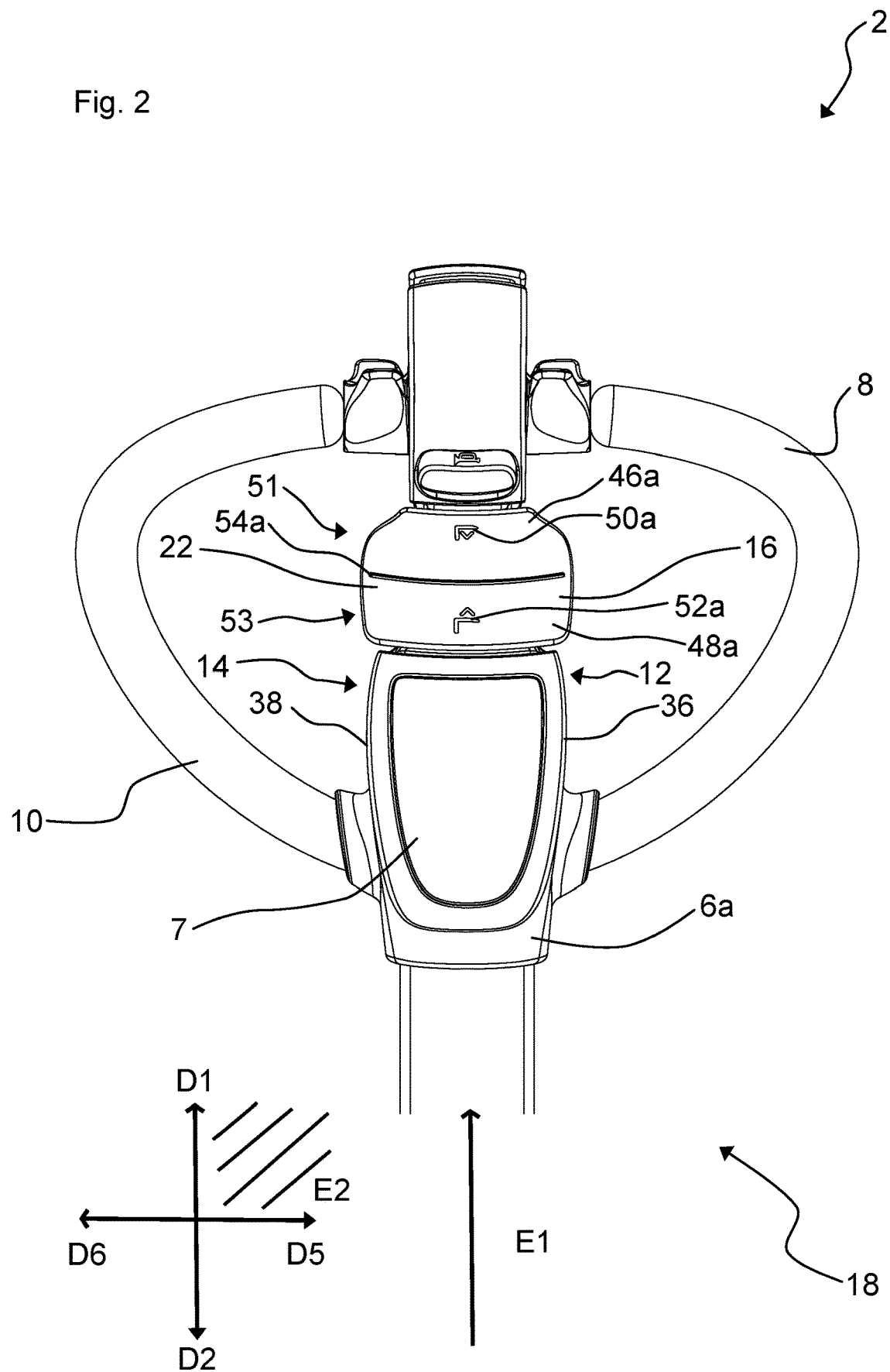
FIG. 2 shows a frontal view of the tiller head from its front side.

FIG. 1 shows a perspective view from above a tiller head 2 from a front side 18 of the tiller head 2. The tiller head 2 may be configured to be mounted onto an industrial truck 4, shown in FIGS. 5 to 8. FIG. 2 shows the tiller head 2 from the front side in a front view. Herein, the front side is indicated by arrow 18 in FIG. 1 and FIG. 2. FIGS. 1 and 2 show a top direction D1 and a bottom direction D2, wherein the bottom direction D2 is opposite to the top direction D1. The directions D1 and D2 are within the drawing plane of FIG. 1 and FIG. 2. A top-bottom axis D1-D2 is defined as an axis comprising the top and bottom directions D1, D2. FIG. 1 shows a forward direction D3 and a backward direction D4, wherein the backward direction D4 is opposite to the forward direction D3. The directions D3 and D4 extend perpendicular out of and into the drawing plane of FIG. 2, respectively. A forward-backward axis D3-D4 is defined as an axis comprising the forward and backward directions D3, D4. The forward-backward axis D3-D4 is perpendicular to the top-bottom axis D1-D2. FIG. 2 shows a left direction D5 and a right direction D6, wherein the right direction D6 is opposite to the left direction D5. The directions D5 and D6 are within the drawing plane of FIG. 2. A left-right axis D5-D6 is defined as an axis comprising the left and right directions D5, D6. The left-right axis D5-D6 is perpendicular to the top-bottom axis D1-D2 and to the forward-backward axis D3-D4.

Figure 3:
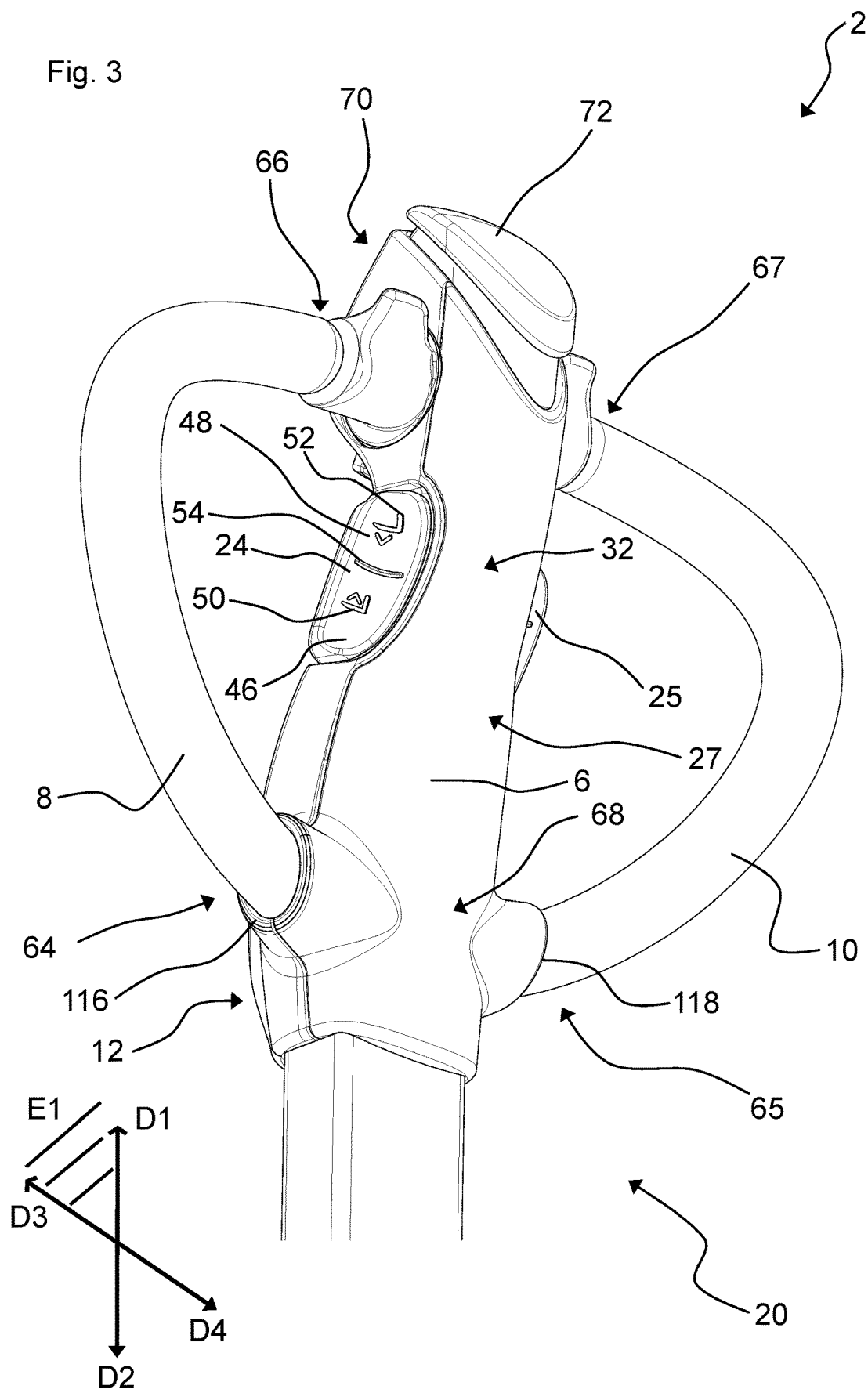
FIG. 3 shows a bottom perspective view of the tiller head from a back side of the tiller head.
Figure 4:
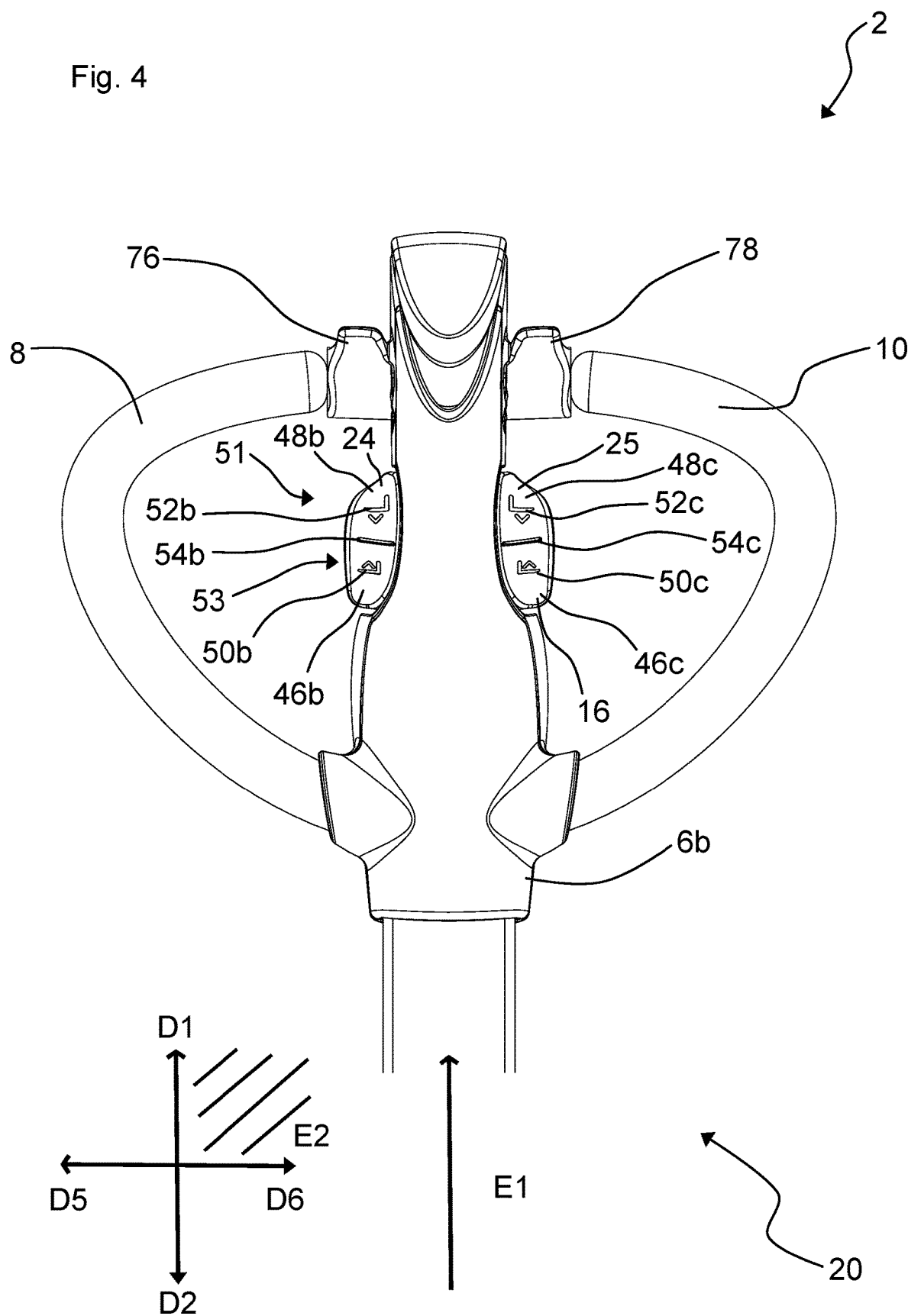
FIG. 4 shows a frontal view of the tiller head from its back side.

The forward-backward D3-D4 and top-bottom D1-D2 axes define a plane E1, shown in FIGS. 3 and 4. FIG. 3 shows a perspective view from below of the tiller head 2 from a back side 20 of the tiller head 2 and FIG. 4 shows the tiller head 2 directly from the back side 20 in a frontal view. Herein, the back side is indicated by arrow 20 in FIGS. 3 and 4. The plane E1 is located at a central position of the tiller head 2 with respect to the extension of the tiller head 2 along the left-right axis D5-D6. The tiller head 2 is essentially configured symmetrically with respect to the plane E1, which may therefore be referred to as a plane of symmetry of the tiller head 2. The top-bottom D1-D2 and left-right D5-D6 axes define a plane E2. The plane E2 may be located at a central position of the tiller head 2 and/or an actuating element 16 with respect to the extension of the tiller head 2 along the forward-backward axis D3-D4. The plane E1 is perpendicular to the plane E2.

Figure 5:
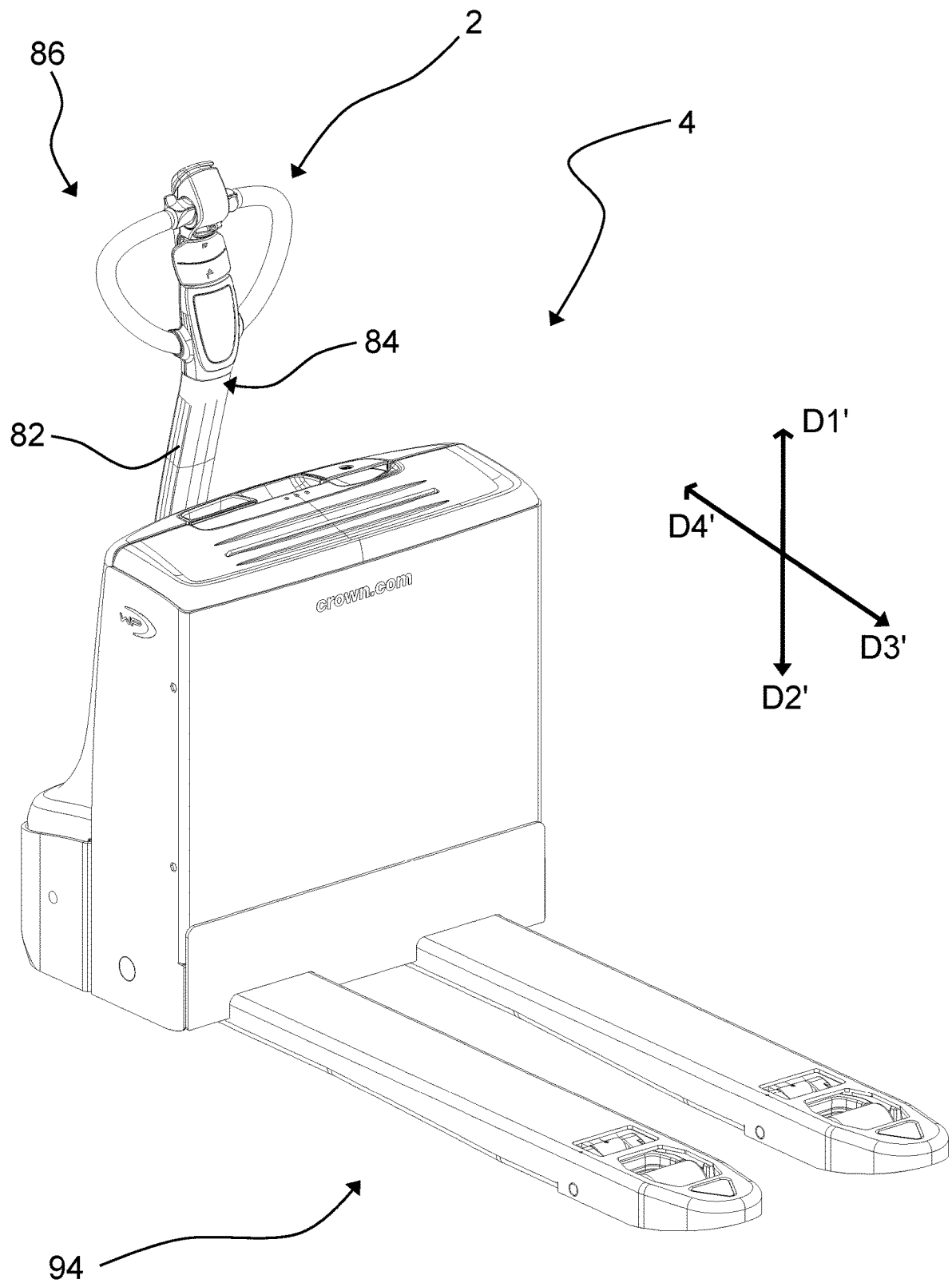
FIG. 5 shows a perspective view of an industrial truck from a front side of the industrial truck, wherein the industrial truck comprises a tiller in a first state.
Figure 6:
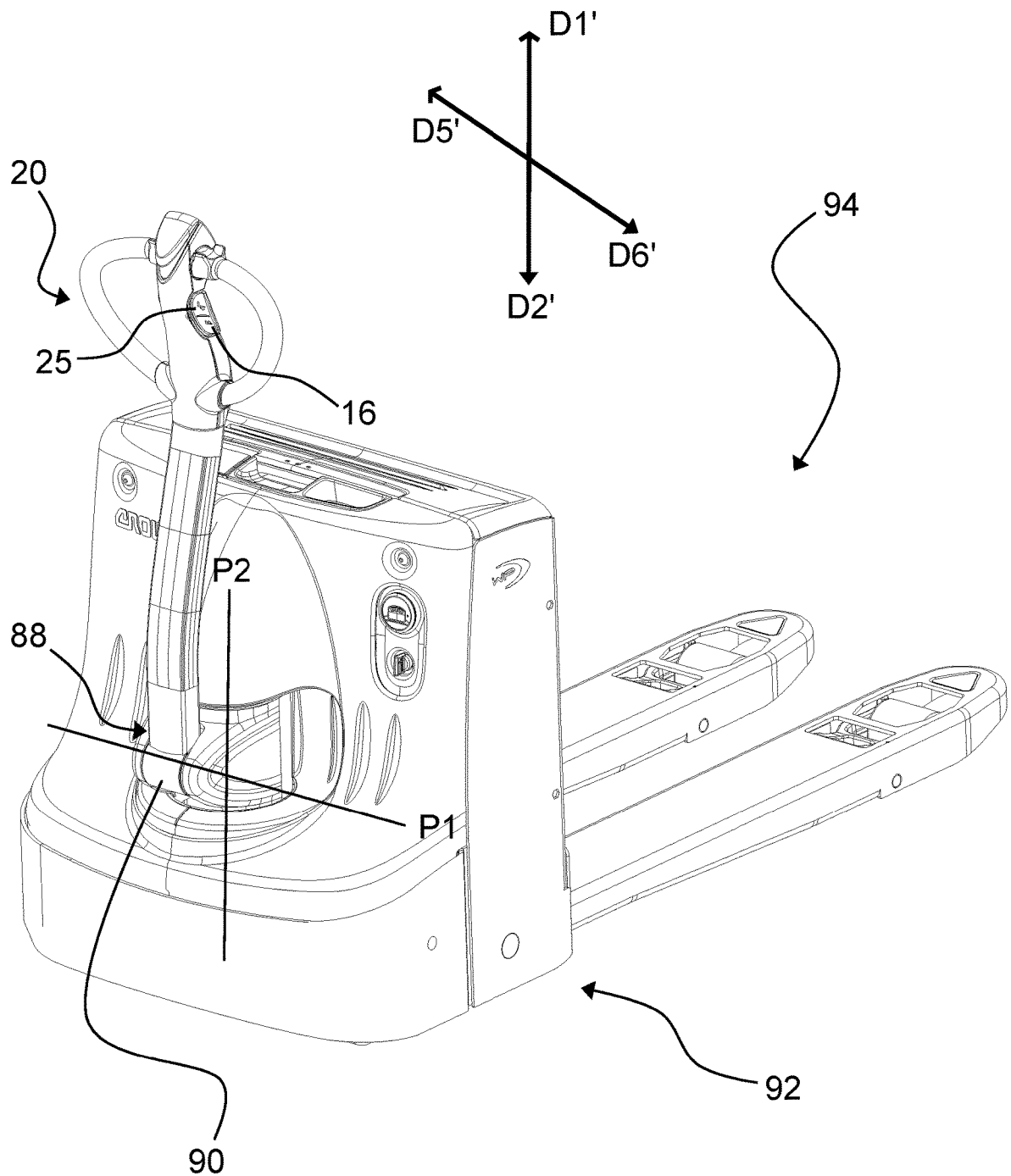
FIG. 6 shows a perspective view of the industrial truck from a back side of the industrial truck, wherein the tiller in the first state.
Figure 7:
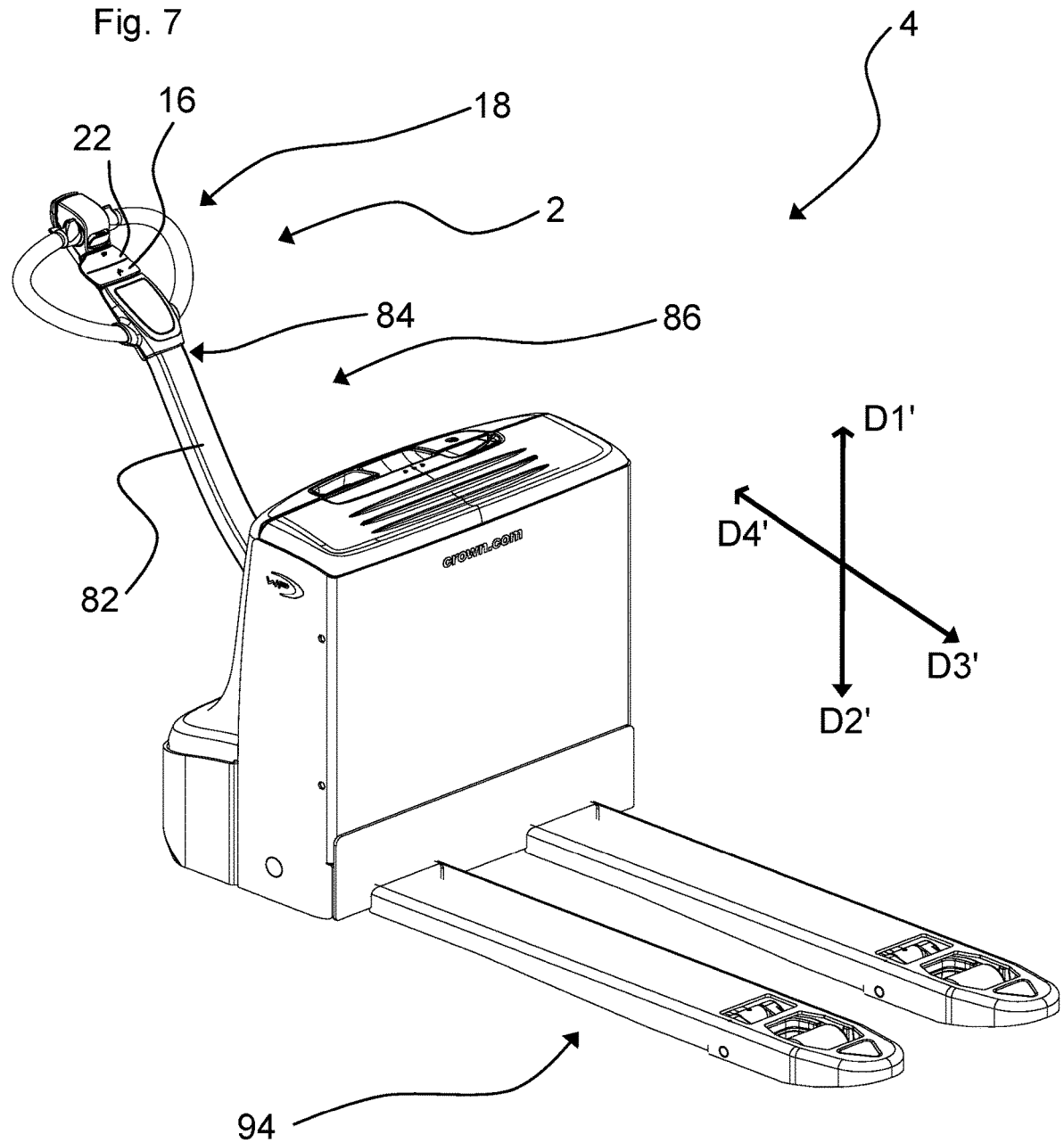
FIG. 7 shows a perspective view of the industrial truck from the front side of the industrial truck, wherein the tiller is in a second state.
Figure 8:
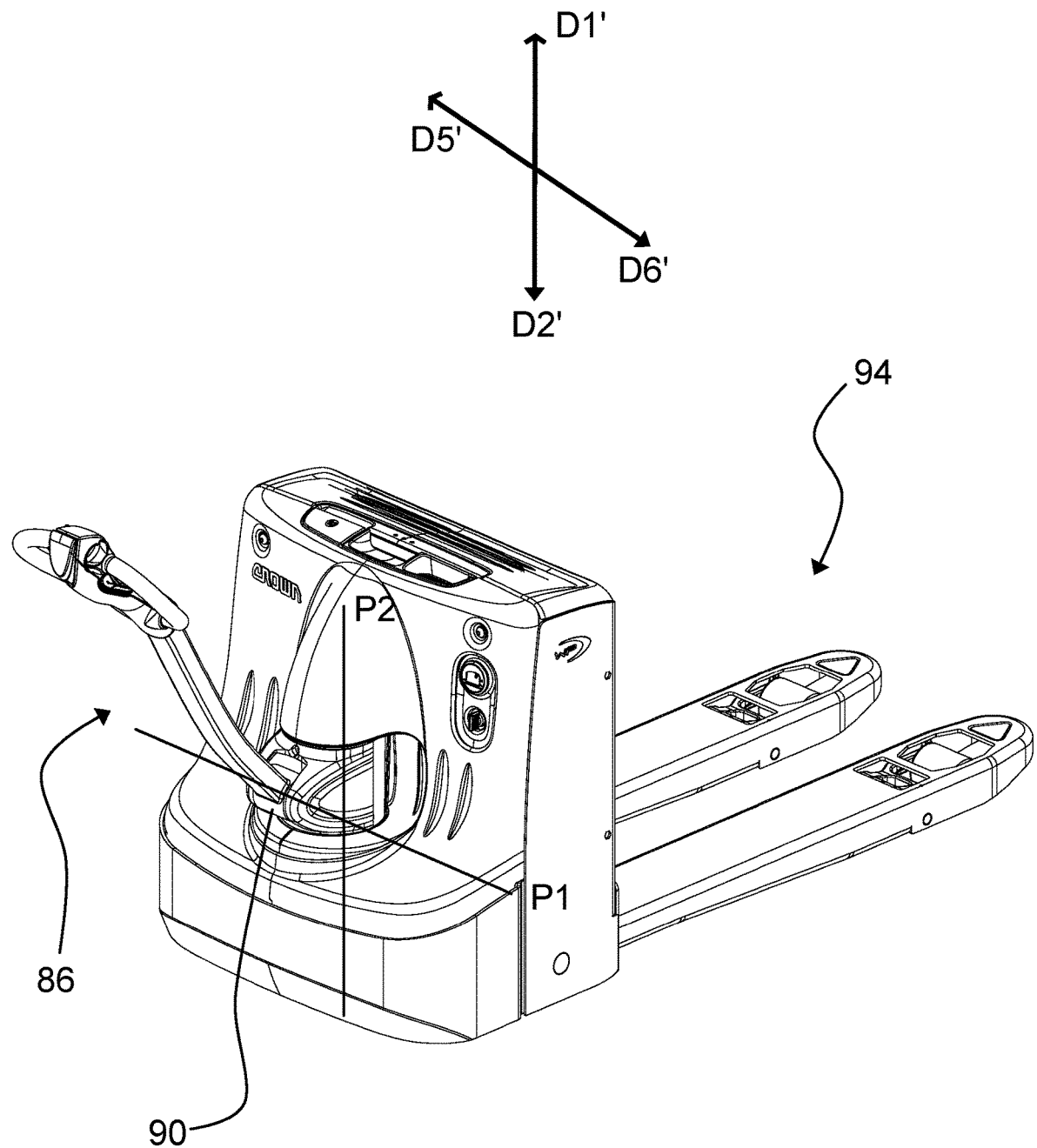
FIG. 8 shows a perspective view of the industrial truck from the back side of the industrial truck, wherein the tiller is in the second state.

As can be seen in FIGS. 5 and 7, and within the drawing plane of FIGS. 5 and 7, a top and a bottom direction D1', D2' of the industrial truck 4 is depicted. Thereto perpendicular, a backward direction D4' of the industrial truck 4 is facing in the opposite direction than a forward direction D3' of the industrial truck 4. Perpendicular to the top and bottom directions D1' and D2' and to the forward and backward directions D3', D4' are a left and a right direction D5', D6' of the industrial truck 4, as shown in FIGS. 6 and 8.

The industrial truck 4 comprises a tiller 86, a body 92, and load carrying means 94, as shown in FIGS. 5 to 8. The tiller 86 may comprise the tiller head 2, a tiller bar 82 and a joint 90. The load carrying means 94 are pivotably mounted onto an end portion of the body 92, which is located at an edge of the body 92 in the bottom-forward D2'-D3' direction. The load carrying means 94 is configured as a pallet fork in the present example, although the industrial truck 4 may be equipped with different load carrying means. The tiller head 2 is mounted onto a first end 84 of the tiller bar 82. The tiller bar 82 is mounted at a second end 88 of the tiller bar 82 to the truck body 92 with the joint 90, which is providing a pivot axis P1 for the tiller 86. The pivot axis P1 is parallel to the left-right D5-D6 axis. The joint 90 is configured to enable a pivoting movement of the tiller within the plane E1. Such a pivoting movement of the tiller 86 may facilitate maneuvering in tight spaces. The joint 90 is configured as a hinge joint in the present example. The industrial truck 4 may comprise a further joint, which is not shown in further detail in the drawings. Said further joint may enable pivoting the tiller 86 about a vertical pivot axis P2, which is parallel to the top-bottom axis D1'-D2'. Pivoting of the tiller 86 around the vertical axis P2 allows to steer the industrial truck 4 when moving, in particular to the left and right. In particular, the horizontal pivot axis P1 is pivotable in a plane defined by the forward-backward D3'-D4' and left-right D5'-D6' axes of the industrial truck 4. The vertical pivot axis P2 may be provided by an axle bearing, which may be oriented along the top-bottom D1'-D2' axis. Said axle bearing may be provided further to the forward direction D3' relative to the joint 90. Hereby, the tiller head 2 is spherically pivotable defined by the pivot axes P1 and P2 and an operator may displace the tiller 86 in a desired direction.

The tiller 86 may be in a first state, shown in FIGS. 5 and 6, wherein the top-bottom axes D1-D2 and D1'D2' are substantially parallel. For example, the tiller 86 is in an essentially upward position in its first state. Such a position allows maneuvers in very tight or narrow spaces. Herein the front side 18 of the tiller head 2 substantially faces in the forward direction D3' of the industrial truck 4. The tiller 86 may be in a second state, shown in FIGS. 7 and 8, wherein the tiller 86 is tilted about the horizontal pivot axis P1 such that the front side 18 of the tiller head 2 faces in a top-forward direction D1'-D3' of the industrial truck 4. For example, the tiller 86 is in a pivoted position and/or walking position which facilitates control of the industrial truck 4, in particular steering, when moving forward and backward, in particular at a cruise speed.

Figure 9:
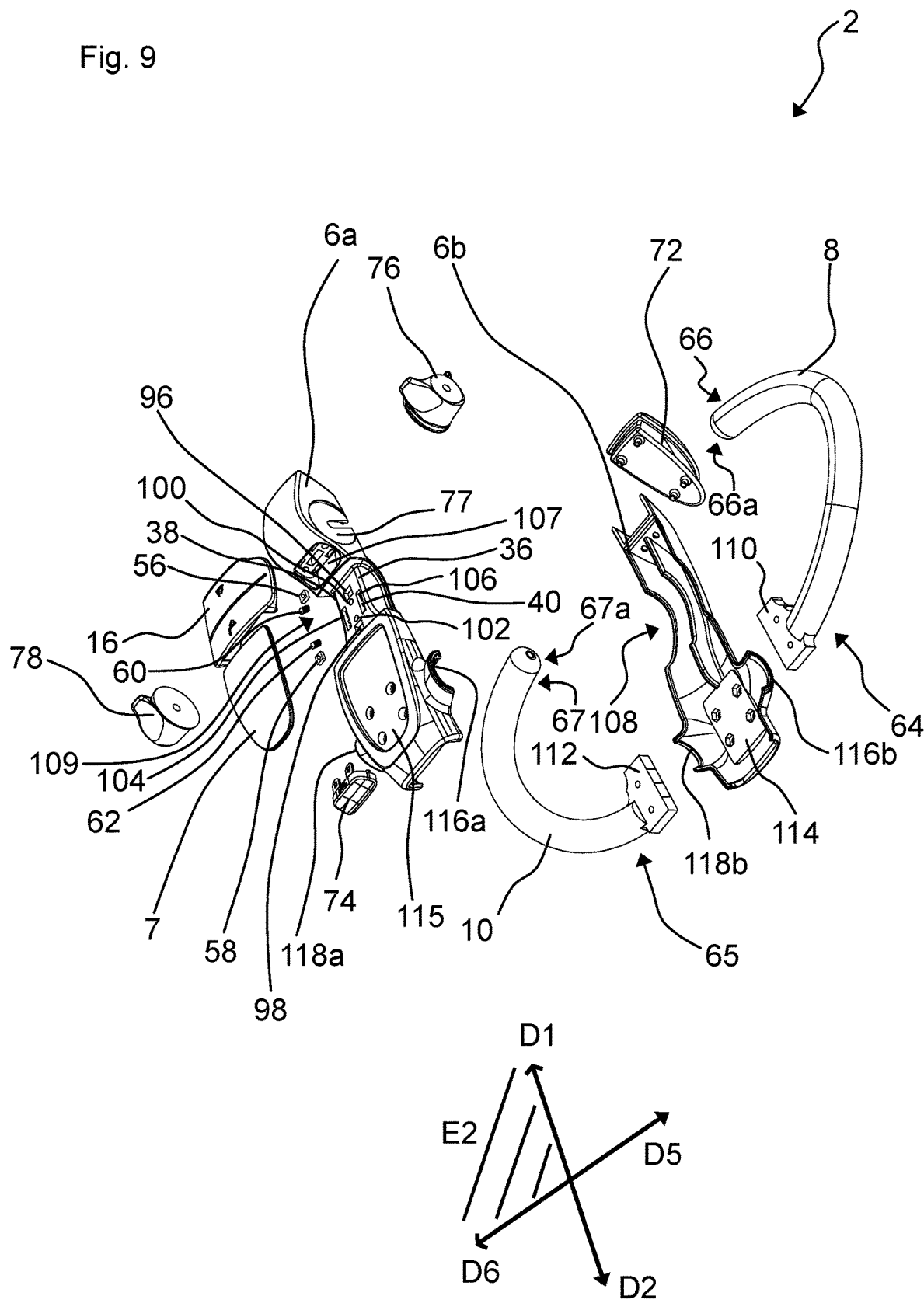
FIG. 9 shows an explosion view of the tiller head according to an embodiment.

The tiller head 2 comprises a central portion 6. The central portion 6 is formed by a front portion 6a and a back portion 6b, which are shown in FIGS. 2, 4, and 9. In an assembled configuration of the tiller head 2, as can be seen in FIGS. 1 to 8, the front and back portions 6a, 6b form a hollow compartment 108 shown in FIG. 9, which may house electronics of the tiller head 2. The front portion 6a defines a front side 26 of the central portion 6, which substantially faces in the forward direction D3, as shown in FIG. 1. The front side 26 substantially defines the surface portions of the central portion 6 which substantially face in the forward direction D3. The back portion 6b defines a back side 27 of the central portion 6 shown in FIG. 3, which substantially faces in the backward direction D4. The back side 27 substantially defines the surface portions of the central portion 6 which substantially face in the backward direction D4.

The central portion 6 comprises a main extension direction along the top-bottom axis D1-D2. An end of the central portion 6 in the bottom direction D2 defines a bottom side 30 of the tiller head 2, which substantially faces in the bottom direction D2, shown in FIG. 1. An end of the central portion 6 in the top direction D1 defines a top side 28 of the tiller head 2, which substantially faces in the top direction D1. The central portion 6 comprises a right side 14 of the central portion 6. The right side 14 substantially faces in the right direction D6. The central portion 6 comprises a left side 12 of the central portion 6, shown in FIG. 3. The left side 12 substantially faces in the left direction D5. The sides 12, 14 define surface portions of the central portion 6 substantially facing in the left and right direction D5, D6, respectively.

The central portion 6 comprises a bottom section 68, a mid-section 32, and a top section 70, shown in FIG. 3. The bottom section 68 is arranged closest to the bottom side 30 of the tiller head 2. The top section 70 is arranged closest to the top side 28 of the tiller head 2. The mid-section 32 is arranged between the bottom section 68 and the top section 70 along the top-bottom axis. Approximately, the central portion 6 may be divided equidistantly into the three sections 68, 32, and 70 along the top-bottom axis.

The central portion 6 comprises a left edge 36 and a right edge 38, shown in FIGS. 1 and 2. The edges 36, 38 are formed by the intersection of the front side 26 with the left and right side 12, 14, respectively. The edges 36, 38 may be angular or curved. The right side 14 is connected to the front side 26 via the right edge 38. The left side 12 is connected to the front side 26 via the left edge 36. Each of the edges 36, 38 may substantially extend along the top-bottom axis over the whole length of the central portion 6. In the presently shown embodiment, the edges 36, 38 also extend along the central portion 6 in the mid-section 32, where the edges 36, 38 are at least partially covered by the actuating element 16. As can be taken from the explosion view of FIG. 9, there is a step between the edges 36, 38 of the mid-section 32 to the top section 70 and to the bottom section 68.

The tiller head 2 comprises a left handle portion 8, which is attached to the left side 12 of the central portion 6, as shown in FIG. 1. The tiller head 2 comprises a right handle portion 10, which is attached to the right side 14 of the central portion 6. The handle portions 8, 10 are arranged symmetrically with respect to the central portion 6, in particular, the handle portions 8, 10 are arranged symmetrically with respect to the plane E1. The handle portions 8, 10 and the central portion 6 define a plane, which may be parallel to the plane E2. A left end 42 of the left handle portion 8 forms a left end of the tiller head 2 and a right end 44 of the right handle portion 10 forms a right end of the tiller head 2. The left end 42 is arranged furthest away from the central portion 6 in the left direction D5. The right end 44 is arranged furthest away from the central portion 6 in the right direction D6.

The left handle portion 8 extends at a first end 64 in a top-left direction from the left side 12 of the bottom section 68 of the central portion 6, as shown in FIGS. 3 and 4. The first end 64 is the end portion of the left handle portion 8 attached to the bottom section 68. In a mounted state, as can be seen in FIG. 3, the first end 64 of the left handle portion 8 is surrounded by a bulge portion 116 of the central portion 6. As can be seen in FIG. 9, the bulge portion 116 is formed by a front half 116*a* and by a back half 116*b*. The front half bulge portion 116*a* is a portion of the front portion 6*a*, wherein the back half bulge portion 116*b* is a portion of the back portion 6*b*. The bulge portion 116 may be configured to clamp onto a tube-like section of the left handle portion 8. The first end 64 of the left handle portion 8 comprises a fixation portion 110, which is formed as a fixation plate comprising bore holes. In the mounted state of the tiller head 2, the fixation portion 110 substantially extends within a plane parallel to the plane E2. The fixation portion 110 is bolted to a fixation portion 114 of the back portion 6*b* of the central portion 6 and to a fixation portion 115 of the front portion 6*a* of the central portion 6. Further, the fixation portion 110 is bolted to the first end 84 of the tiller bar 82, thereby fixing the tiller head 2 to the tiller bar 82. A cover panel 7, which is part of the front side 26 of the central portion 6 may be mounted onto the front portion 6*a* to cover the respective screws for the bolted fixation. The cover panel 7 may, for example, be attached to the front portion 6*a* of the central portion 6 with a friction fit or snap-connection. Symmetrically to the plane E1, the right handle portion 10 comprises a first end 65, which is surrounded by a bulge portion 118. The bulge portion 118 comprises of a front half 118*a* and a back half 118*b*. The first end 65 of the right handle portion 10 comprises a fixation portion 112 and is configured to be mountable to the central portion 6. In particular, each of the fixation portions 110, 112, 114, and 115 is configured to be mountable to the first end 84 of the tiller bar 82.

At the left end 42, the left handle portion 8 bends in a top-right direction, as shown in FIGS. 1 and 2. The curvature of the left handle portion 8 is smaller in a first section between the first end 64 and the left end 42 compared to a second section between the left end 42 and a second end 66 of the left handle portion 8. The second end 66 is the end of the left handle portion 8 closest to the top section 70. Along the top-bottom axis, the left end 42 is closer to the second end 66 than to the first end 64, as can be seen in FIG. 4. Overall, the left handle portion 8 is U-shaped, wherein the U is turned to the right with its open side. As described prior, the left handle portion 8 and the right handle portion 10 are symmetrically arranged. Hence, the right handle portion 10 extends at the first end 65 via the right end 44 and towards a second end 67 of the right handle portion 10.

The top side 28 of the tiller head 2 is at least partially formed by a further actuating element 72, as can best be seen in FIG. 3. The actuating element 72 faces in a top-backward direction D1-D4. The actuating element 72 may be a pushing or pressing button, wherein operation of the button may control an emergency brake and/or an auto-reversing functionality of the industrial truck 4, shown in FIGS. 5 to 8. By operation of the actuating element 72 of the industrial truck 4 in a walking mode of the industrial truck 4 as shown in the embodiments of FIGS. 5 to 8, the industrial truck 4 will advance in the forward direction D3'. Below the actuating element 72 and in the bottom direction D2, a spring element may be located to push the actuating element 72 in the top direction D1 after operation and after release of the actuating element 72 by the operator.

The tiller head 2 comprises another further actuating element 74. The actuating element 74 is arranged on the front side 26 of the central portion 6, as can be seen in FIG. 1. In particular, the actuating element 74 is arranged on a protruding section 75. As can be seen in FIG. 9, the actuating element 74 is arranged in a recess 107 of the protruding section 75. The protruding section 75 faces in the forward direction D3 and is curved, such that a top end of the protruding section 75 faces in a top-forward direction D1-D3 and a bottom end of the protruding section 75 faces in a bottom-forward direction D2-D3. The actuating element 74 is mounted to the bottom end of the protruding section 75 and is facing in the bottom-forward direction D2-D3. The actuating element 74 may be a pushable or pressable button or alternatively, it may be a rocking paddle switch actuating element 74. The actuating element 74 may control a horn of the industrial truck 4. Due to its location, the actuating element 74 is easy to reach in the pivoted position of the tiller 86, thus facilitating warning when driving the industrial truck 4, in particular at cruise speed. Below the actuating element 74 and in the top-backward direction, a spring element may be located to push the actuating element 74 in the bottom-forward direction after operation and after release of the actuating element 74 by the operator.

The actuating element 16 is, with respect to the plane E1, symmetrically mounted to the front side 26 of the central portion 6, as can be seen in FIGS. 1 and 2. In particular, the actuating element 16 is mounted to the mid-section 32 of the central portion 6, as shown by FIG. 3. As shown by FIG. 9, portions of the front side 26 and of the left and right side 12, 14 of the central portion 6 comprise a recess 109. The actuating element 16 is mountable on the recess 109, such that an operable front surface 22 of the actuating element 16 is arranged flush with the adjacent parts of the front side 26 of the central portion 6 within the front side 18 of the tiller head 2, as visible in FIG. 1. The operable front surface 22 describes the surface portions of the actuating element 16 facing in the forward direction D3, as visible in FIGS. 1 and 2. A left operable back surface 24 and a right operable back surface 25 describe surface portions of the actuating element 16 facing in the backward direction D4, as shown in FIGS. 3 and 4. Herein, the left and right surfaces 24, 25 are located in the left and right direction D5, D6 of the central portion 6, respectively.

The extension of the actuating element 16 in the left-right axis D5-D6 is greater than the extension of the mid-section 32 of the central portion, as visible in FIGS. 3 and 4. In other words, the actuating element 16 extends at the front side 26 of the central portion 6 further into the left and right direction D5, D6 than the mid-section 32 of the central portion 6. In particular, a left and right edge of the actuating element 16 is arranged further into the left and right direction D5, D6 than the left and right front edge 36, 38 of the mid-section 32, respectively. As shown in FIG. 3, the actuating element 16 extends into the backward direction D4. In particular, a left and right portion of the actuating element 16 extend along the left and right side 12, 14 of the central portion 6, respectively, from the front side 26 of the central portion 6 in the backward direction D4. The extension of the actuating element 16 in the backward direction D4 stops prior to a plane defined by the back side 20 of the tiller head 2. The left and right portions of the actuating element 16 are nested on the left and right side 12, 14 of the central portion 6, respectively.

Along the top-bottom axis D1-D2, the actuating element 16 comprises a top section 51 and a bottom section 53, as can be seen well in FIGS. 2 and 4. The top section 51 is a portion of the actuating element 16 located further in the top-direction D1 than the bottom section 53. As can be taken from FIG. 9, the actuating element 16 is pivotably mounted about a pivot axis 40, wherein the pivot axis 40 extends along the left-right axis D5-D6. For example, a cylindrically shaped axis portion, which is not shown, may be provided in each recess 104, 106. The recesses 104 and 106 extend along the top-bottom axis D1-D2. Each of the recesses 104, 106 may be configured to provide a snap fit connection with the actuating element 16. The snap-fit connection may be configured to provide the pivot axis 40.

The actuating element 16 can be pivoted by a pushing operation of the operator on either of the top and bottom sections 51, 53 in a forward and backward direction D3, D4, respectively, e.g. by either pushing on the operable front surface 22 or the operable back surfaces 24, 25. The top and bottom sections 51, 53 both comprise part of the operable front surface 22 and of the two operable back surfaces 24, 25. In the present embodiment, the actuating element 16 is configured as a rocking paddle switch actuating element. After operation and release of the actuating element 16, the actuating element 16 is pushed back by a restoring force. In the initial position, the operable front surface 22 and the front side 18 of the tiller head 2 both face in the forward direction D3. At least one of two spring elements 60, 62, which are arranged in the top and bottom direction D1, D2 with respect to the pivot axis 40, respectively, may exert the restoring force on the actuating element 16. The top spring element 60 is housed in a top recess 100, the bottom spring 62 is housed in a bottom recess 102, shown in FIG. 9. The recesses are formed on the front side 26 of the mid-section 32 of the central portion 6. The recesses 100, 102 are formed as further recesses within the recess 109 of the actuating element 16.

The pivoting of the actuating element 16 is detectable by two microswitches 56 and 58. Each of the two microswitches 56, 58 is configured to detect a pushing force in the backward direction D4 on the microswitch 56, 58, respectively. Each microswitch 56, 58 is housed in a recess 96 and 98, respectively. The recesses 96, 98 are formed on the front side 26 of the mid-section 32 of the central portion 6. The recesses 96, 98 are formed as further recesses within the recess 109 of the actuating element 16. By pushing the actuating element 16 on one of the microswitches, said microswitch at least provides one output signal indicating said pushing operation. That output signal may be used by electronics of the industrial truck 4 to control a functionality of the industrial truck 4. The signal from the top microswitch 56 may control a different functionality than the signal from the bottom microswitch 58. In the presently shown embodiment, the actuating element pivoting controls lowering and lifting of the load carrying means 94. The top microswitch 56 is located further upward in the top-direction D1 than the bottom microswitch 58.

As can be seen in FIGS. 1 to 4, each of the operable front and back surfaces 22, 24, 25 of the actuating element 16 comprises a pair of a first and a second operable surface portion 46 and 48. The pushing operation on the first and second operable surface portion 46, 48 from either the front or back side 18, 20 of the tiller head 2 is detectable by the top and bottom microswitch 56, 58, respectively. The top microswitch 56 is configured to detect pushing of the first operable surface portion 46 of each of the front and back surfaces 22, 24, 25. The bottom microswitch 58 is configured to detect pushing of the second operable surface portion 48 of each of the front and back surfaces 22, 24, 25. As shown in FIG. 2, the operable front surface 22 comprises a first operable surface portion 46a located in the top section 51 of the actuating element 16. The operable front surface 22 comprises a second operable surface portion 48a in the bottom section 53 of the actuating element 16. As shown in FIG. 4, the left and right operable back surfaces 24, 25 comprise a first operable surface portion 46b, 46c in the bottom section 53 of the actuating element 16, respectively. The left and right operable back surfaces 24, 25 comprise a second operable surface portion 48b, 48c in the top section 51 of the actuating element 16, respectively. For example, along the top-bottom axis D1-D2, the first and second operable surface portions 46, 48 are arranged in the reverse order on the operable back surfaces 24, 25 as compared to the operable front surfaces 22.

Each adjacent first and second operable surface portion 46, 48 is separated by a ridge 54, as shown in FIGS. 1 and 3, which protrudes from the respective front and back surfaces 22, 24, 25. In particular, between each of a first pair 46a, 48a, a second pair 46b, 48b, and a third pair 46c, 48c of the first and second operable surface portion is a respective ridge 54a, 54b, and 54c arranged. The ridge 54 extends substantially horizontally, in particular in a plane defined by the left-right D5-D6 and forward-backward D3-D4 axes. In the shown embodiment, each ridge 54 is arranged parallel to the pivot axis 40 of the actuating element 16. The ridge 54 may be tactile sensible by the operator. For instance, the ridge 54 may protrude out of each of the actuating operable surfaces 22, 24, 25 in the forward and backward D3, D4 direction, respectively. Alternatively, notches may be provided instead of the ridges 54, which are recessed in each of the actuating operable surfaces 22, 24, 25 in the backward and forward direction D4, D3 direction, respectively. The trained operator, who is aware of the location of the first and second operable surface portions 46, 48 on the front and back side 18, 20 of the tiller head 2, may sense the ridge 54 with at least one finger and thereby know, without having to look at the tiller head 2, which part of the operable surface portion one must operate in order to control a desired functionality of the industrial truck 4.

As can be seen in FIGS. 1 to 4, each of the first operable surface portions 46 comprises one first marker 50. Each of the second operable surface portions 48 comprises one second marker 52. The first and second markers 50, 52 may be formed by ridges and/or notches and may either protrude into and/or out of the actuating element 16. The first and second markers 50, 52 are configured to be haptically and/or visible sensible by the operator. The first and second markers 50, 52 are configured to indicate the functionality operated by pushing a respective part of the actuating element 16. In the shown example, the first and second markers 50, 52 have a shape indicating raising and lowering operation of the load carrying means 94. Visible in FIG. 3 are the first and second markers 50, 52 in an upward orientation. Each marker 50, 52 shows a pictogram of the industrial truck 4 in combination with an operation arrow. The industrial truck 4 is depicted as flat lying 'L'. In the upward orientation, the operation arrow of the first marker 50 faces in the top direction D1. The first marker 50 indicates the raising operation of the industrial truck 4. Accordingly, the operation arrow of the second marker 52 faces in the bottom direction D2. The second marker 52 indicates the lowering operation of the industrial truck 4. FIG. 4 shows first and second markers 50*b*, 52*b* on the first and second operable surface portions 46*b*, 48*b*, respectively. The first and second operable surface portions 46*c*, 48*c* comprise first and second markers 50*c*, 52*c*, respectively. The operable surface portions 46*b*, 46*c*, 48*b*, 48*c* may be operated by the operator in the first state of the tiller 86, as shown in FIGS. 5 and 6. In the first state, the operator may prefer to operate the actuating element 16 from the back side 20 of the tiller head 2, as the operator stands behind and further in the backward direction D4' relative to the industrial truck 4.

FIG. 2 shows first and second markers 50*a*, 52*a* on the first and second operable surface portions 46*a*, 48*a*, respectively. The markers 50*a*, 52*a* shown in FIG. 2 are in a downward orientation, wherein the operation arrow of the first marker 50*a* points in the bottom direction D2 and the operation arrow of the second marker 52 points in the top direction D1. Herein, the pictogram of the industrial truck 4 is shown upside-down. The operable surface portions 46*a*, 48*a* may be operated by the operator with the tiller 86 in the second state, which is shown in FIGS. 7 and 8. In the second state, the operator usually operates the actuating element 16 from the front side 18 of the tiller head 2. Hereby, the operator stands behind and further in the backward direction D4' than the industrial truck 4 and may look in a bottom direction D2' onto the tiller head 2. Thus, the markers 50, 52 on the operable front surface 22 of the actuating element 16 are oriented upwardly as seen from the operator.

The operable front surface 22 is formed concave along the top-bottom axis D1-D2. The most recessed location with respect to the topmost and bottommost edge of the operable front surface 22 in the backward direction D4 coincides with the ridge 54. Said concavity facilitates operation of the actuating element 16 from the front side while reducing the risk of unwanted actuation, for example due to a collision with another object. The operable front surface 22 is formed convex along the left-right axis D5-D6. The most protruding location with respect to the leftmost and rightmost edge of the operable front surface 22 in the forward direction D3 coincides with the middle of the actuating element 16 and with the plane E1. Said convexity facilitates operation of the actuating element 16 from the front side while reducing the risk of unwanted actuation, for example due to a collision with another object. Each of the operable back surfaces 24, 25 is formed concave in a direction from the edge formed by the intersection of each operable back surface 24, 25 with the operable front surface 22 towards the backward facing edge forming the end of each operable back surface 24, 25. E.g., each operable back surface 24, 25 is recessed towards the plane E1 in a forward direction D3 and a right or left direction D6, D5, respectively. Said concavity facilitates operation of the actuating element 16 from the back side when the operator is holding the handle portions 8, 10 while reducing the risk of unwanted actuation, for example due to a collision with another object. The concavity of the operable back surfaces 24, 25 can best be seen in FIG. 3. Additionally, each operable back surface 24, 25 may also be formed concave essentially along the top-bottom axis D1-D2, with the most recesses location with respect to the topmost and bottommost edge of the operable back surfaces 24, 25 in the forward direction D3 coincides with the ridge 54 of each operable back surface 24, 25.

As shown in FIGS. 3, 4 and 9, the tiller head 2 comprises two further actuating elements 76, 78. A left and right actuating element 76, 78 is arranged between the second ends 66, 67 of the left and right handle portions 8, 10 and the left and right side 12, 14 of the top section 70 of the central portion 6, respectively. In particular, the actuating elements 76, 78 are arranged in a right and left direction D6, D5 and next to right and left surface portions 66*a*, 67*a* of the second ends 66, 67 of the left and right handle portions 8, 10, respectively. The right and left surface portions 66*a*, 67*a* of the second ends 66, 67 are defined as surface portions of said ends 66, 67 which at least partially face in the right and left direction D6, D5, respectively. In the mounted state of the tiller head 2, there may be a gap between the second ends 66, 67 of the handle portions 8, 10 and the actuating elements 76, 78, respectively. Alternatively, the actuating elements 76, 78 may contact the second ends 66, 67, which may provide support and optionally part of a bearing for the actuating elements 76, 78.

The left side 12 of the central portion 6 comprises a recess 77 in the top section 70, as shown in FIG. 9. The right side 14 of the central portion 6 comprises an identical recess in the top section 70, which is not shown in the drawings. The actuating elements 76, 78 are at least partially housed by the corresponding recesses. The two actuating elements 76, 78 are rotatably arranged, in particular about the left-right axis D5-D6, wherein the rotation axes corresponds to the longitudinal axis of each of the substantially cylindrically formed actuating elements 76, 78. Each of the two further actuating elements 76, 78 is configured to be operated by a thumb, for example by pushing on a wing part protruding from the cylindrical part of the two further actuating elements 76, 78. Each of the actuating elements 76, 78 comprises two protrusions, which are substantially arranged such that approximately a third of the lateral surface of each actuating element 76, 78 is demarcated from the other two thirds of the lateral surface. Hereby, operation with a finger, preferably the thumb, is simplified. After operation by the operator, the actuating elements 76, 78 may return into an initial position, preferably by a restoring force of a spring element. The initial positions of the actuating elements 76, 78 are shown in FIGS. 1 to 4.

Figure 12:
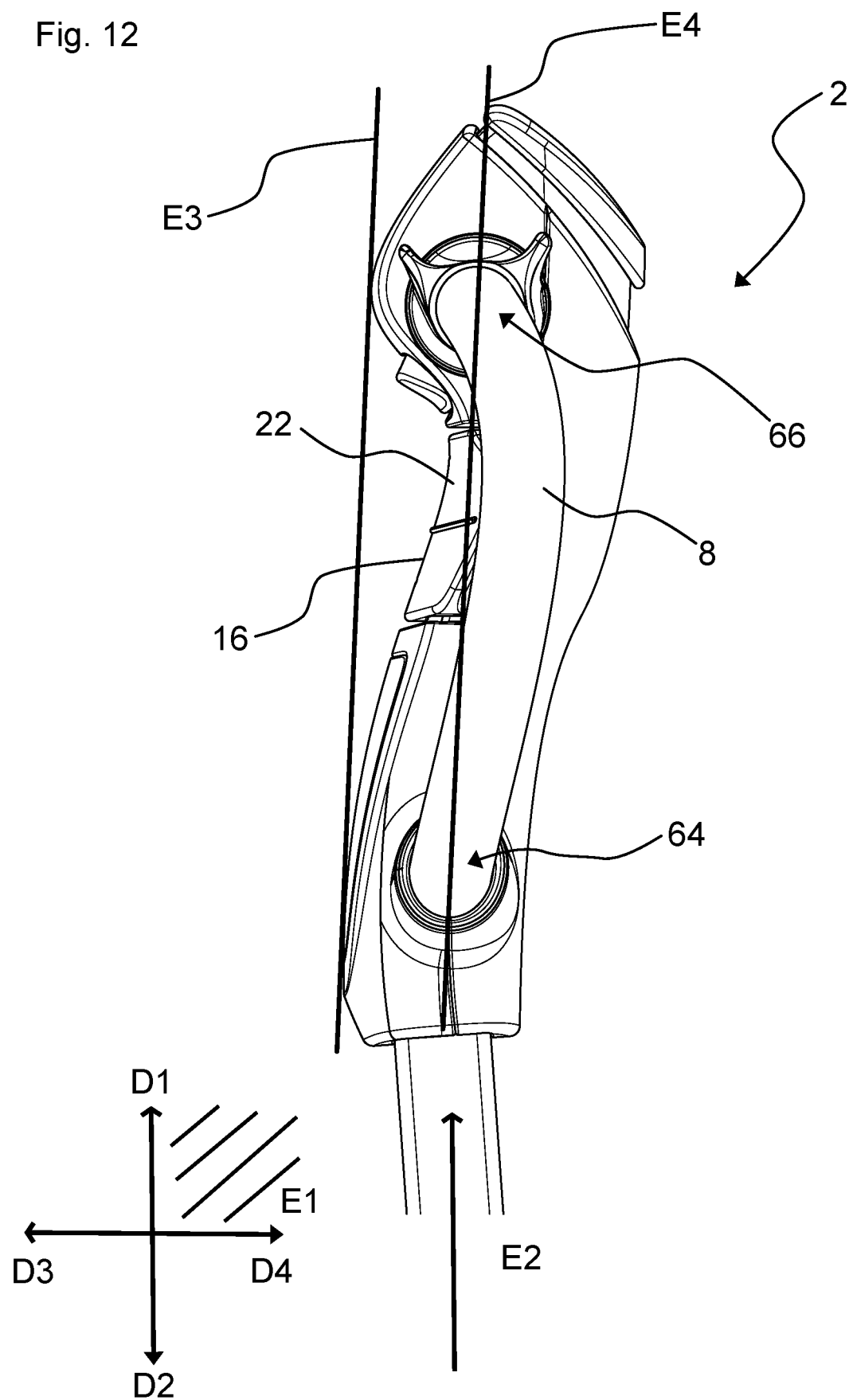
FIG. 12 shows a side view of the tiller head from its left side.

When viewing the tiller head 2 from the left side, as shown in FIG. 12, the relative positioning of the handle portions 8, 10 and the actuating element 16 along the forward-backward axis D3-D4 can be described in detail. Sections of the front side 26 of the front portion 6*a* in the bottom and top section 68, 70, which are located furthest in the forward direction D3, define a plane E3. The middle of the first ends 64, 65 and the second ends 66, 67 of the handle portions 8, 10 define a plane E4, wherein the middle of the first and second ends 64, 65, 66, 67 are the geometric centers of the first and second ends 64, 65, 66, 67 within the plane defined by the forward-backward D3-D4 and top-bottom D1-D2 axes. Both planes E3 and E4 extend into and out of the image plane of FIG. 12 and therefore in the left-right direction D5-D6. The complete actuating element 16 is further set back in the backward direction D4 than the plane E3. At least partially, the operable front surface 22 of the actuating element 16 is further set back in the backward direction D4 than the plane E4. A major part of the operable back surfaces 24, 25 of the actuating element 16 is further set back in the backward direction D4 than the plane E4.

When holding the handle portions 8, 10, the operator may easily operate the operable back surfaces 24, 25 even with comparable short reaching thumbs, as the relative positioning of the actuating element 16 further to the back side 20 of the tiller head 2 facilitates reaching these operable back surfaces 24, 25. On the other hand, whilst being able to operate the rotating actuating elements 76, 78, the operator may easily operate the operable front surface 22 of the actuating element 16, in particular with his index finger. Especially, when the tiller 86 is in the second state and facing upwards, by setting the actuating element 16 and thus the operable front surface 22 further back in the backward direction D4, unwanted overflexion of the underside of the operating fingers may be prevented.

Also visible from FIG. 12 is a so called "three-dimensional curvature" of the handle portions 8, 10. As described prior, the handle portions 8, 10 are bent within the plane E2. Handle portions 8, 10, according to the embodiment shown, also show a curvature out of the plane E2. Herein, the handle portions 8, 10 extend from the bottom section 68 of the tiller head 2 towards the back direction D4. Upon approximately two thirds from the first ends 64, 65 of the handle portions 8, 10 to the second ends 66, 67 of the handle portions 8, 10 along the top-bottom axis D1-D2, the curvature of the handle portions 8, 10 in the plane E1 maximizes. From this point until the second ends 66, 67 of the handle portions 8, 10, the handle portions 8, 10 extend towards the front direction D3. Advantageously, by having such a "three-dimensional curvature", the ergonomics of the handle portions 8, 10, and thus of the tiller head 2, may be improved. Thus, handling by the operator may be facilitated.

In another, not explicitly shown, embodiment, the handle portions 8, 10 may solely be bent within one plane, preferably the plane E2. Thus, the handle portions 8, 10 might be producible in a cost-efficient manner.

As can be seen in FIGS. 5 to 8, also the tiller bar 82 shows a curvature in the forward D3 and backward D4 direction. Herein, as can be best seen in FIG. 6, the tiller bar 82 extends towards the top direction D1 from the second end 88 of the tiller bar 82. After approximately one third between the second end 88 and the first end 84 of the tiller bar 82, the tiller bar 82 is bent towards the forward direction D3. At the first end 84, the tiller bar 82 is slightly bent into the backward direction D4, as can best be seen in FIGS. 5 and 7. This configuration may allow an operator to stand relatively close to the body 92 of the industrial truck 4, thereby minimizing the needed standing space behind the industrial truck 4, whilst also allowing the operator to freely handle the tiller head 2 spaced apart from the upper body of the operator.

In another, not explicitly shown, embodiment, the tiller bar 82 may be straight. Herein, a cost-efficient tiller bar 82 may be provided.

As shown in FIGS. 10a, 10b, 11a, and 11b, the tiller head 2 according to an embodiment of the invention comprises an access control device 120. The access control device 120 comprises a user interface device 122. The access control device 120 may comprise computing means, located within the hollow compartment 108 of the central portion 6. Said computing means may be electrically and/or electronically connected to other computing means and/or a power supply via cables within said hollow compartment 108.

The user interface device 122 is arranged at the bottom section 68 and on the back side 20 of the tiller head 2. The user interface device 122 forms the back side 27 in the bottom section 68 of the tiller head 2. The user interface device 122 may substantially form a planar surface, in particular a planar surface within the plane E2. The user interface device 122 may be flush with adjacent parts of the tiller head 2 or may project therefrom, in particular in the backward direction D4. The user interface device 122 may be arranged symmetrically along the left-right axis D5-D6 with respect to the plane E1. The user interface device 122 may be arranged symmetrically along the top-bottom axis D1-D2 with respect to the center of the first ends 64, 65 of the two handle portions 10, 12. The user interface device 122 comprises a left and right edge 37, 39. The left and right edge 37, 39 terminate the extension of the user interface device 122 towards the left and right side 12, 14 of the central portion 6. The user interface device 122 comprises a bottom edge 34. The bottom edge 34 forms the bottom edge of the tiller head 2 at the back side 20 and terminates said tiller head 2 towards the bottom direction D2. However, the bottom edge 34 of the user interface device 122 may also be formed separately and spaced apart from the bottom edge of the tiller head 2. The user interface device 122 comprises a top edge 35. The top edge 35 terminates the user interface device towards the top direction D1.

The user interface device 122 comprises a display 124. The display 124 may, for example, be a LED, OLED or LCD display. The display 124 is substantially formed in a rectangular shape, with the short side along the top-bottom axis D1-D2 and the long side along the left-right axis D5-D6. The display 124 is arranged on the top end of the user interface device 122 in the top direction D1. The display 124 extends along the total width of the central portion 6 along the left-right axis D5-D6.

Figure 10A:
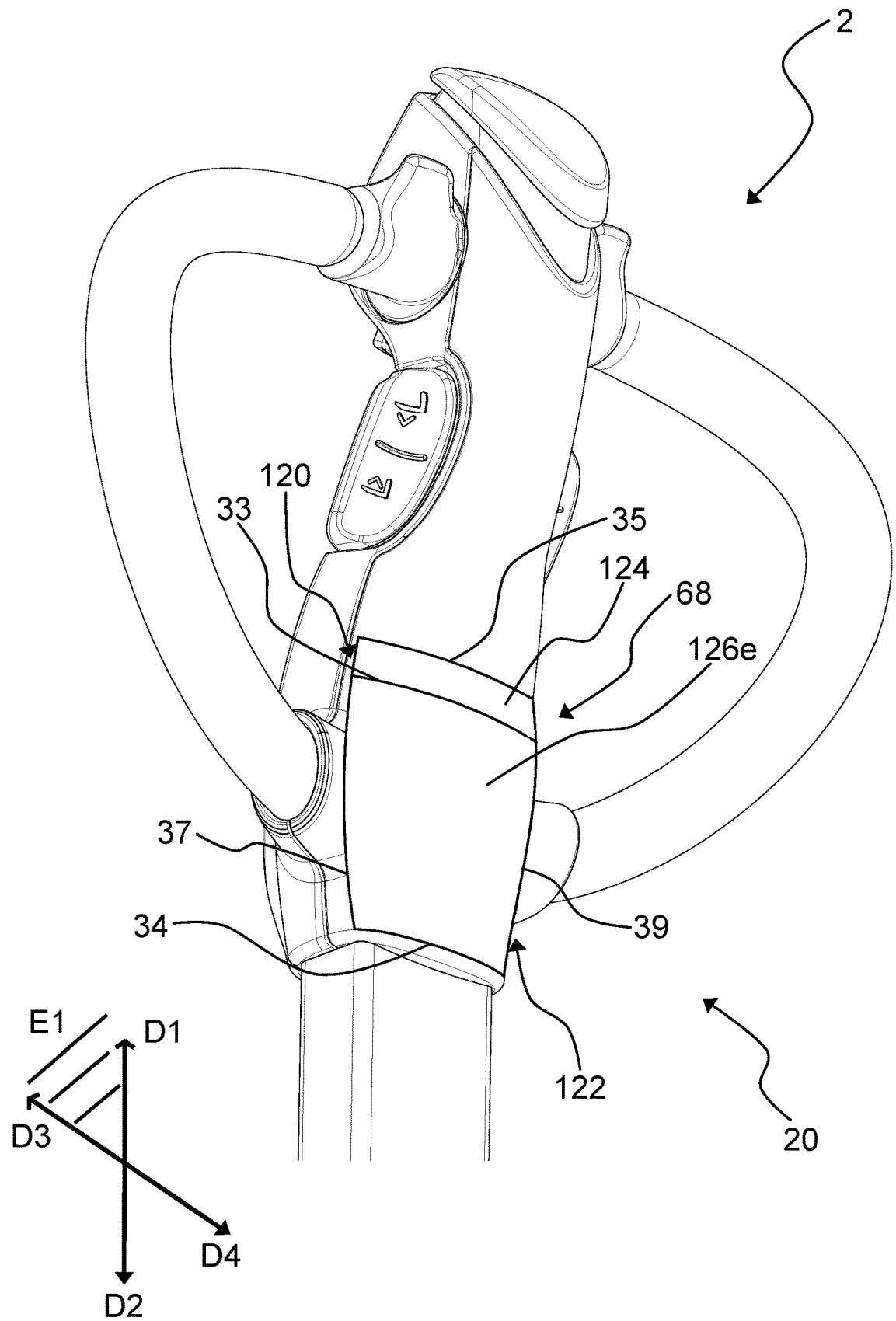
FIG. 10a shows a bottom perspective view of the tiller head from a back side of the tiller head, wherein the tiller head comprises an access control device with a touchscreen according to an embodiment.

The user interface device 122 according to one embodiment shown in FIG. 10a comprises a touchscreen 126e, which may comprise the display 124 or be separate thereto. For example, the display 124 may be a section of the touchscreen 126e that is not configured to receive a user input. The touchscreen 126e is formed in a rectangular shape, with the short side along the left-right axis D5-D6 and the long side along the top-bottom axis D1-D2. The touchscreen 126e is arranged on the bottom end of the user interface device 122 in the shown example. The touchscreen 126e extends along the total width of the central portion 6 along the left-right axis D5-D6. The touchscreen 126e with the display 124 extends along the total height of the user interface device 122 along the top-bottom axis D1-D2. The touchscreen 126e and the display 124 may be separated by a ridge 33, if formed by separate devices, wherein the ridge 33 may protrude out of or into the plane E2 the user interface device 122 is located in. Similarly, if the touchscreen 126e also forms the display 124, the lower part configured for receiving user inputs may be separated by a ridge, for example glued to the touchscreen 126e.

Figure 10B:
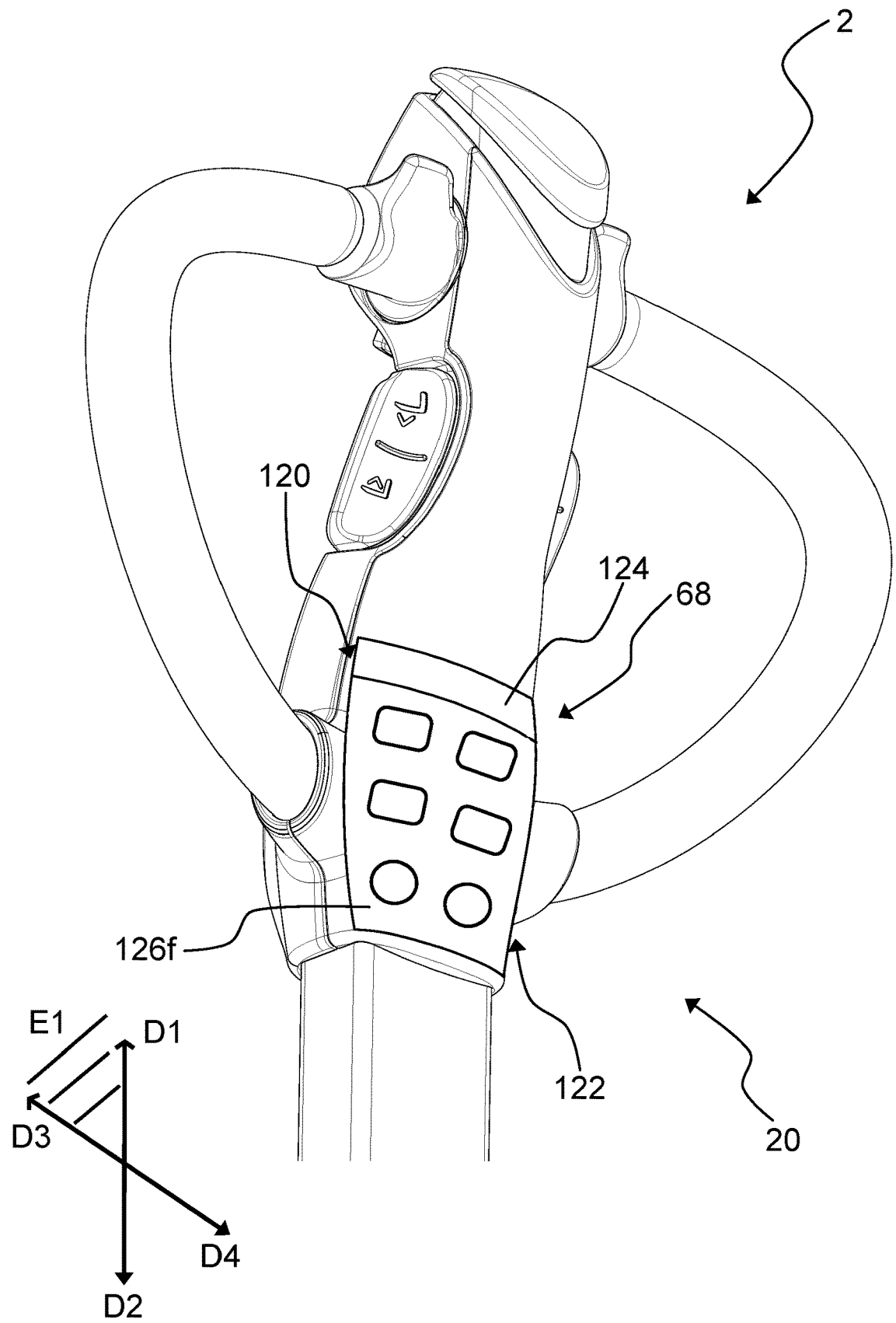
FIG. 10b shows a bottom perspective view of the tiller head from a back side of the tiller head, wherein the tiller head comprises an access control device with a keypad according to an embodiment.

The user interface device 122 according to one embodiment shown in FIG. 10b comprises a keypad 126f. Substantially, the keypad 126f extends similar to the touchscreen 126e shown in FIG. 10a. The keypad 126f comprises multiple buttons, arranged in rows and columns along the left-right D5-D6 and top-bottom axis D1-D2. The buttons may comprise signs indicating numbers and/or letters. The embodiment according to FIG. 10b comprises the display 124, which is separate to the keypad 126f. Alternatively, the tiller head 2 with the access control device 120 may also not comprise a display.

Figure 11A:
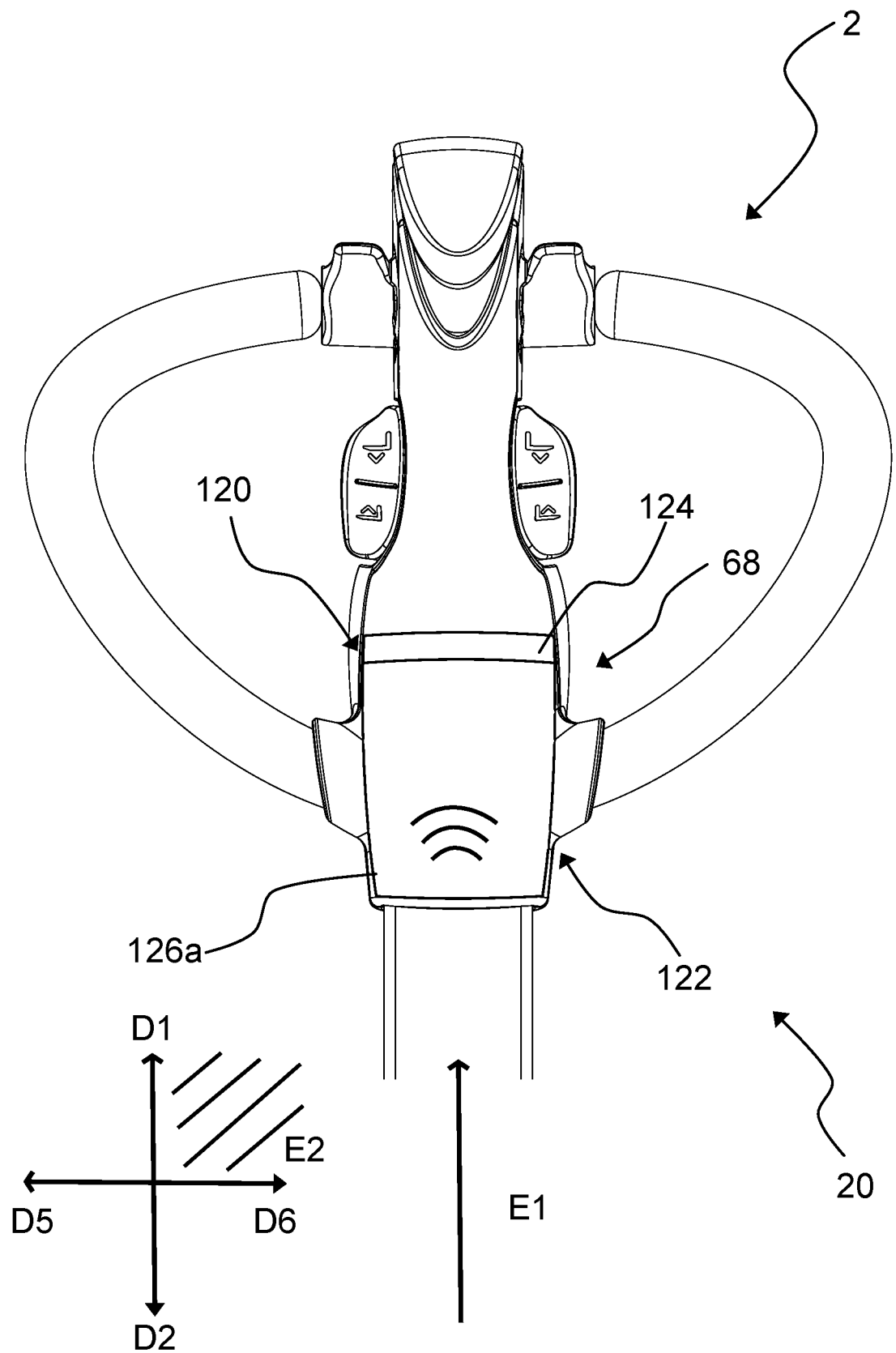
FIG. 11a shows a frontal view of the tiller head from its back side, wherein the tiller head comprises an access control device with an RFID-reader according to an embodiment.

The user interface device 122 according to one embodiment shown in FIG. 11a comprises an RFID-reader 126a. The RFID-reader 126a comprises hardware, such as an antenna, located inside the hollow compartment 108. The RFID-reader 126a comprises a surface which forms the back side 27 in the bottom section 68 of the tiller head 2. The surface comprises a sign indicating the RFID-reader 126a within the tiller head 2, which may indicate where an RFID-chip needs to be placed to be read by the RFID-reader 126a. The working range of the RFID-reader 126a may be formed spherically around the position of the RFID-reader 126a on the tiller head 2. The working range of the RFID-reader may also be essentially limited to the area where the RFID-chip touches or is close to touching the surface indicated by the sign.

Figure 11B:
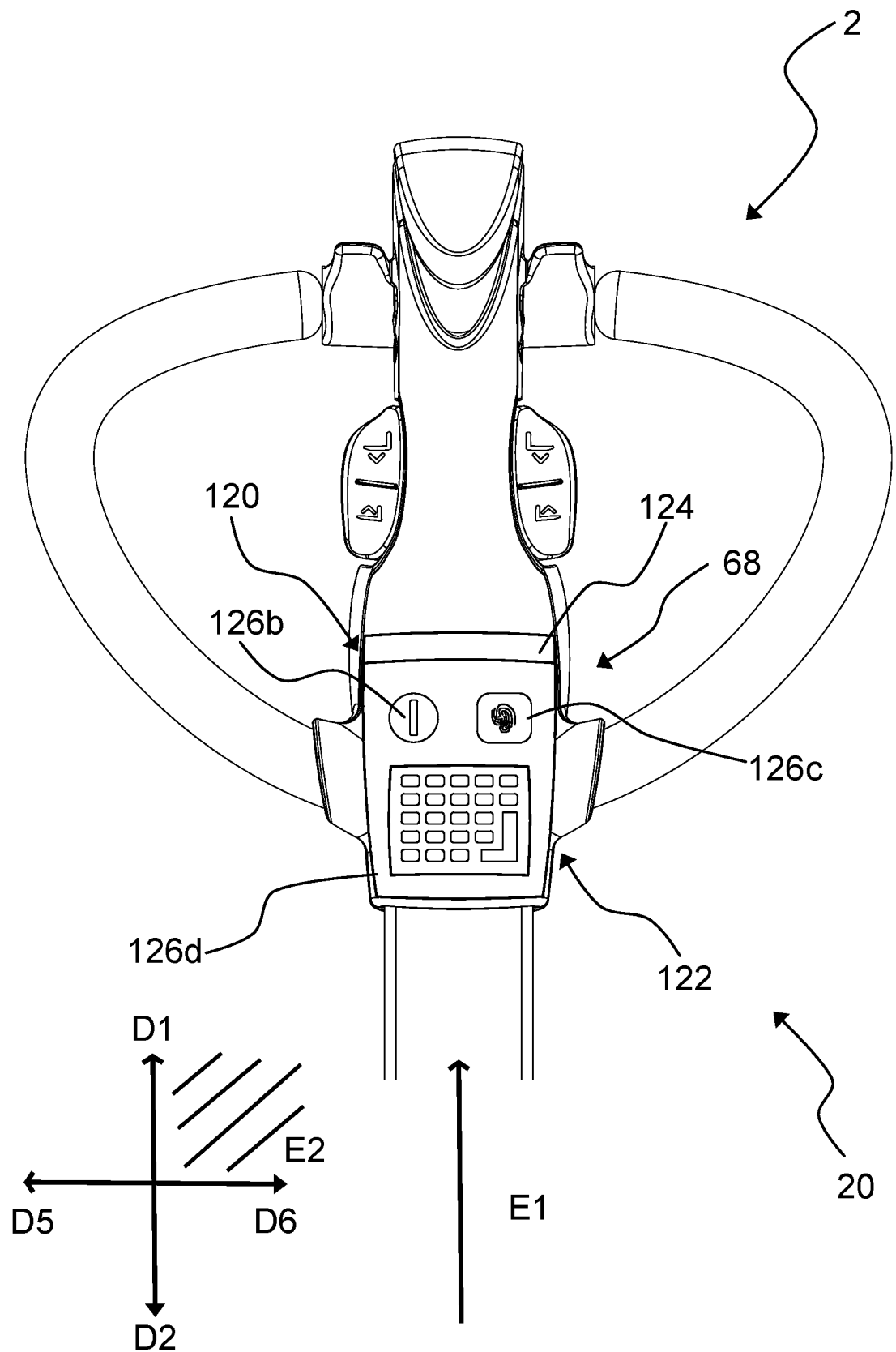
FIG. 11b shows a frontal view of the tiller head from its back side, wherein the tiller head comprises an access control device with a locking-cylinder, a fingerprint scanner, and a keyboard according to an embodiment.

The user interface device 122 according to one embodiment shown in FIG. 11b comprises a locking cylinder 126b, a biometric scanner 126c, and a keyboard 126d. According to an embodiment, the user interface device 122 may comprise any of these or any combination of these devices 126b, 126c, 126d. The biometric scanner 126c shown in FIG. 11b may, for example, be configured as a fingerprint scanner. The locking cylinder 126b may be configured to be unlocked by a corresponding key, preferably by a switching movement of said key. According to one embodiment, the user interface device 122 comprises only the locking cylinder 126b, which may be arranged centrally on the user interface device 122. In an alternative embodiment, the keyboard 126d is arranged on the bottom end of the user interface device 122 and extends along the total width of the central portion 6 along the left-right axis D5-D6. The biometric scanner 126c and the locking cylinder 126b are arranged above the keyboard 126d in the top direction D1. The biometric scanner 126c and the locking cylinder 126b are arranged in a substantially rectangular shaped area, which extends along the total width of the central portion 6 along the left-right axis D5-D6. The biometric scanner 126c and the locking cylinder 126b are arranged below the display 124 in the bottom direction D2.

Figure 13:
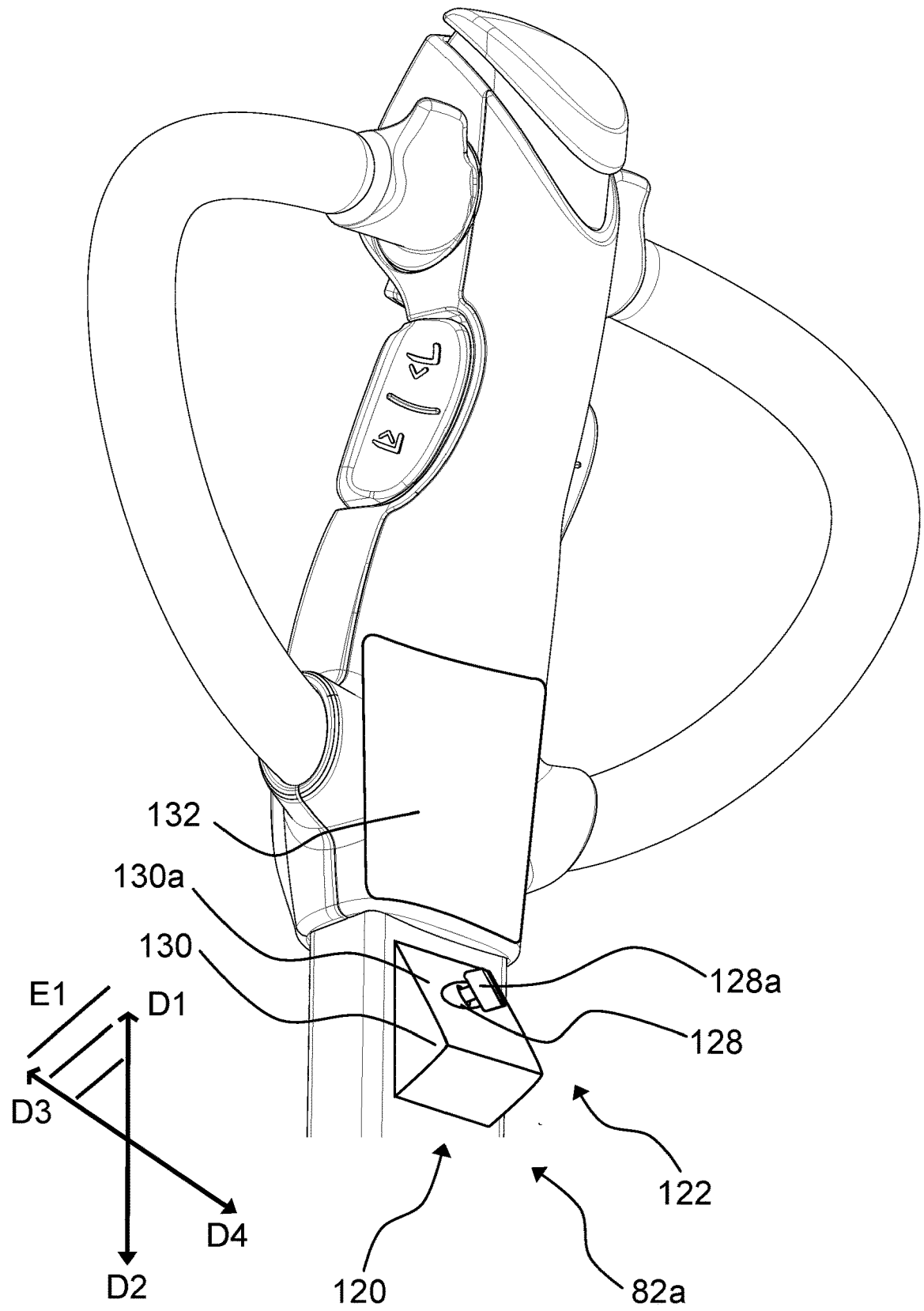
FIG. 13 shows a bottom perspective view of the tiller head and a part of the tiller from a back side of the tiller head, wherein the tiller comprises an access control device with a locking cylinder.

According to another embodiment, which is shown in FIG. 13, the tiller 86 comprises an access control device 120 with a user interface device 122. The user interface device 122 comprises a locking cylinder 128, which is unlockable by a key 128a inserted into a keyhole of the locking cylinder 128. The locking cylinder 128 is at least partially arranged in a protrusion 130 of the tiller bar 82. In particular, the keyhole is arranged on said protrusion 130 of the tiller bar 82. The protrusion 130 is located at a top section of the tiller bar 82, which is located at or near the first end 84 of the tiller bar 82. The protrusion 130 extends from the back side 82a of the tiller bar 82, wherein the back side 82a substantially extends in the top-bottom and left-right plane E2. Said protrusion 130 may either be formed by parts of the tiller bar 82 or by an additional piece, which is attached to the back side 82a of the tiller bar 82, e.g. by gluing, welding, or by bolts. The protrusion 130 is presently wedge-shaped, wherein it tapers towards the top direction D1. The protrusion 130 comprises a planar surface 130a facing in the top-backward direction D1-D4. The top of the locking cylinder 128 is arranged flush with the planar surface 130a, such that the locking cylinder 128 also faces in the top-backward direction D1-D4. Therefore, by mounting the locking cylinder 128 on said wedge-shaped protrusion 130, the locking cylinder 128 faces towards the face of an operator standing behind the industrial truck 4 in the backward direction D4, and the operator may face comfortably the surface 130a of the protrusion 130 and hence face and operate the locking cylinder 128 easily. Further, the protrusion increases available space for the locking cylinder, allowing a long axial length thereof. According to an embodiment, the locking cylinder 128 is the user interface device 122. In other words, the operator may activate the industrial truck 4 or at least functions of the industrial truck 4 by inserting the key 128a into the keyhole of the locking cylinder 128 and turning the key 128a, e.g. in clockwise direction. No additional user interface devices are needed, nor is any kind of display needed. However, an additional display and/or user interface device for the tiller head's access control device 120 may be provided according to the embodiments described above. By turning the key 128a in counterclockwise direction, the industrial truck 4 or at least said activated function or functions of the industrial truck 4 may be turned off.

As can be taken from FIG. 13, parts of the central portion 6 of the tiller head 2 shown in that embodiment may be identical to other embodiments with different user interface devices, in particular those shown in FIGS. 10 to 12. Instead of mounting the interface device in the central body, the interface device in form of the locking cylinder 128 is arranged on the tiller bar 82. The open space in the central portion 6 reserved for those user interface devices is closed by a cover element 132. Such a construction allows a modular choice of user interfaces according to customer requirements, potentially reducing costs of adaptation. The cover element may, for example, be a steel plate or an injection molded part.

According to an embodiment, the access control device 120 may confirm the operator's right to use the industrial truck 4 before usage of at least a set of functionalities operable via the tiller head 2 is possible. According to this embodiment, the operator may stand behind the tiller head 2 in direction D4, wherein the tiller 86 is in the upward standing state. The operator may unlock the locking cylinder 126b with a key. For example, everyone out of a group of potential operators may hold a key with which the locking cylinder 126b may be unlocked. According to this embodiment, by unlocking the locking cylinder 126b with the key, the access control device 120 may confirm the right to move the industrial truck 4. Accordingly, the operator may then, for example, use either of the actuating elements 76, 78 to move the industrial truck 4. Alternatively, the operator's right to use the industrial truck 4 may be confirmed by any of the other shown means. For example, the operator's right to use the industrial truck may be confirmed by entering a pin-code on the keyboard 126c, touchscreen 126e or keypad 126f, providing a fingerprint to the biometric scanner 126c or providing an RFID-chip to the RFID-reader 126a at a reading distance. In a further example, a combination may be required to confirm the operator's right to use the industrial truck 4. For example, user interface device 122 according to the embodiment shown in FIG. 11b may require both an appropriate fingerprint and pin-code for the access control device 120 to confirm the operator's right to use the industrial truck 4.

In response to the confirmation of the operator's right to use the industrial truck 4, the access control device may allow the use of all functions. In another example, certain means of confirmation, such as with the key, may only permit use of a limited set of functions, such as a driving function. In this example, further use of the industrial truck 4, e.g. usage of other functionalities and/or a different set of functions, is not yet permitted by the access control device 120, and hence not yet operable by the operator via any buttons of the tiller head 2. In this case, the operator may be required to further identify himself and/or his rights. For example, besides unlocking the locking cylinder 126b with a key, a specific operator may additionally identify himself by using the biometric scanner 126c. In particular, by swiping one finger over the fingerprint scanner, the access control device 120 may be configured to confirm this operator's right to use other functionalities and/or a different set of functions of the industrial truck 4. For example, lowering and/or raising the load carrying means 94 of the industrial truck 4, operated via the actuating element 16, may only be permitted after such a user identification. The access control device 120 may further be configured to inform the operator about the confirmation and the usable functionalities via the display 124.

Summarizing, the embodiment shown relates to a tiller head 2 with the actuating element 16 which is comfortably operable by the operator in many possible situations. For example, in an everyday situation in warehouses, the operator may be required to use the actuating element 16 in cases where the tiller 86 is in the first state and thus in the upward position or where the tiller 86 is in the second state and thus in the walking position. Sometimes, the space in the environment of the industrial truck 4 is limited, requiring the operator to stand next to the tiller 86 in different directions relative thereto, depending on space constraints. For example, the operator may be required to stand behind the industrial truck 4, to its left side, to its right side or even on the load carrying means 94. Depending on his position and/or the position of the tiller 86, the operator may prefer to use either one of the operable front surface 22 and back surfaces 24, 25 of the actuating element 16. The design of the tiller head 2 described herein facilitates control of the industrial truck 4 by providing the plurality of differently arranged operable surfaces 22, 24, 25, which are easy to reach and provided in an ergonomic design. For example, the operator is able to use the same actuating element 16 from the front side 18 and from the back side 20 of the tiller head 2. Further, the different operable surfaces 22, 24, 25, which are provided on different sides of the tiller head 2 with different orientations, are provided in a simple and cost-effective manner by just one actuating element 16. Hence, the tiller head 2 may be provided with an easy structure and simplified sensorics that still enables the operator to easily control complex operations of the industrial truck 4. By comparison, normally a control such as provided by the actuating element 16 requires several actuating elements and more complex sensorics, for example by providing at least two actuating elements and two microswitches for each of the two actuating elements for the raising and/or lowering operation of the load carrying means 94.

The invention claimed is:

1. An industrial truck comprising a tiller head configured for controlling the industrial truck, the tiller head comprising:
a central portion;
a left handle portion that is attached to a left side of the central portion and a right handle portion that is attached to a right side of the central portion, which is opposite to its left side; and
an actuating element,
wherein the handle portions and the central portion define a front side of the tiller head and a back side of the tiller head, which is opposite to its front side,
wherein the front side of the tiller head and the back side of the tiller head extend transverse to the left side of the central portion and the right side of the central portion,
wherein the actuating element has an operable front surface and an operable back surface, and
wherein the actuating element is mounted on a front side of the central portion.

2. The industrial truck according to claim 1, wherein:
the tiller head has a top side and a bottom side, which is opposite to its top side, transversal to the front and back side of the tiller head and transversal to the right and left side of the central portion; and
the actuating element is arranged at a mid-section of the central portion.

3. The industrial truck according to claim 1, wherein the actuating element has a monolithic construction.

4. The industrial truck according to claim 1, wherein the actuating element is a rocking paddle switch actuating element that is pivotable about an axis, which extends between a left side and a right side of the tiller head.

5. The industrial truck according to claim 1, wherein the actuating element extends at the front side of the central portion beyond an edge of the central portion to form the operable back surface of the actuating element.

6. The industrial truck according to claim 1, wherein:
the actuating element comprises a left operable back surface and a right operable back surface; and
the actuating element extends at the front side of the central portion beyond a left edge of the central portion to form the left operable back surface and beyond a right edge of the central portion to form the right operable back surface.

7. The industrial truck according to claim 1, wherein the industrial truck and the actuating element are configured such that truck functionality controlled by the operable front surface is at least partially identical to truck functionality controlled by the operable back surface.

8. The industrial truck according to claim 7, wherein:
the operable front surface portion of the actuating element comprises a first operable front surface portion and a second operable front surface portion;
the operable back surface portion of the actuating element comprises a first operable back surface portion and a second operable back surface portion; and
the industrial truck and the actuating element are configured such that truck functionality controlled by the first operable front surface portion is identical to truck functionality controlled by one of the first and second operable back surface portions and such that that truck functionality controlled by the second operable front surface portion is identical to truck functionality controlled by the other of the first and second operable back surface portions.

9. The industrial truck according to claim 8, wherein the industrial truck and the actuating element are configured such that truck functionality controlled by an operable front surface portion located at a top section of the operable front surface is identical to truck functionality controlled by an operable back surface portion located at a bottom section of the operable back surface and such that truck functionality controlled by an operable front surface portion located at a bottom section of the operable front surface is identical to truck functionality controlled by an operable back surface portion located at a top section of the operable back surface.

10. The industrial truck according to claim 1, wherein:
the operable front surface portion of the actuating element comprises a first operable front surface portion and a second operable front surface portion;
the actuating element extends at the front side of the central portion beyond a left edge of the central portion to form a left operable back surface and beyond a right edge of the central portion to form a right operable back surface;
the left operable back surface of the actuating element comprises a first operable back surface portion and a second operable back surface portion;
the right operable back surface of the actuating element comprises a first operable back surface portion and a second operable back surface portion; and the industrial truck and the actuating element are configured such that truck functionality controlled by the first operable front surface portion is identical to truck functionality controlled by one of the first and second operable back surface portions of the left operable back surface, the right operable back surface, or both, and such that truck functionality controlled by the second operable front surface portion is identical to truck functionality controlled by the other of the first and second operable back surface portions of the left operable back surface, the right operable back surface, or both.

11. The industrial truck according to claim 1, wherein the actuating element extends towards the back side of the tiller head, in particular along both the left side and the right side of the central portion.

12. The industrial truck according to claim 1, wherein each of the operable front surface and the operable back surface of the actuating element comprises at least a first operable surface portion and a second operable surface portion.

13. The industrial truck according to claim 12, wherein the first operable surface portion is located at a top section of the actuating element at the operable front surface and/or wherein the first operable surface portion is located at a bottom section of the actuating element of the operable back surface.

14. The industrial truck according to claim 13, wherein the second operable surface portion is located at the bottom section of the actuating element at the operable front surface and/or wherein the second operable surface portion is located at the top section of the actuating element at the operable back surface.

15. The industrial truck according to claim 12, wherein the operable front surface of the actuating element comprises two operable surface portions and the operable back surfaces of the actuating element comprises four operable surface portions.

16. The industrial truck according to claim 1, wherein:
the front side of a front portion of the central portion is set back further in a backward direction in the mid-section thereof than the front side of the front portion in the bottom section, the top section, or both; and
the front side of the front portion of the central portion comprises a recess in the mid-section, wherein the actuating element is mounted in the recess, such that the operable front surface of the actuating element is further set back in the backward direction than the front side of the front portion in the bottom section, the top section, or both.

17. The industrial truck according to claim 16, wherein at least a part of the operable front surface of the actuating element is further set back in the backward direction than a plane comprising the middle of the first ends and the middle of the second ends of both handle portions.

18. The industrial truck according to claim 1, wherein:
the actuating element is configured to be operable with an index finger from the front side of the tiller head, while by an operator's hand holding one of the two handle portions;
the actuating element is configured to be operable with a thumb from the back side of the tiller head, by an operator's hand holding one of the two handle portions;
the tiller is adjustable between a first upward and/or standing state and a second pivoted and/or walking state;
in the first state, the front side of the tiller head faces away from an operator; and
in the second state, the front side of the tiller head (2) faces in an upward direction.

19. The industrial truck according to claim 1, wherein the actuating element extends from the left side to the right side of the central portion.

20. A tiller head comprising a central portion, a left handle portion, a right handle portion, and an actuating element, wherein:
the left handle portion is attached to a left side of the central portion;
the right handle portion that is attached to a right side of the central portion, which is opposite to its left side;
the handle portions and the central portion define a front side of the tiller head and a back side of the tiller head, which is opposite to its front side;
the front side of the tiller head and the back side of the tiller head extend transverse to the left side of the central portion and the right side of the central portion;
the actuating element has an operable front surface and an operable back surface; and
the actuating element is mounted on a front side of the central portion.

* * * * *